(12) United States Patent  
Cutrell et al.

(10) Patent No.: US 7,703,040 B2
(45) Date of Patent: Apr. 20, 2010

(54) LOCAL SEARCH ENGINE USER INTERFACE

(75) Inventors: Edward B. Cutrell, Seattle, WA (US); Daniel C. Robbins, Seattle, WA (US); Raman K. Sarin, Redmond, WA (US); Susan T. Dumais, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 480 days.

(21) Appl. No.: 11/172,365

(22) Filed: Jun. 29, 2005

(65) Prior Publication Data

US 2007/0005576 A1      Jan. 4, 2007

(51) Int. Cl.
G06F 3/048       (2006.01)
G06F 7/00        (2006.01)
G06F 17/30       (2006.01)

(52) U.S. Cl. .................. 715/792; 715/715; 707/3; 707/E17.014; 707/E17.061; 707/E17.107; 707/E17.135

(58) Field of Classification Search .................. 715/792
See application file for complete search history.

(56) References Cited

U.S. PATENT DOCUMENTS

| | | | | |
|---|---|---|---|---|
| 5,117,349 | A * | 5/1992 | Tirfing et al. .................. | 707/3 |
| 6,434,745 | B1 * | 8/2002 | Conley et al. .................. | 717/177 |
| 6,460,060 | B1 * | 10/2002 | Maddalozzo et al. ........ | 715/234 |
| 6,496,843 | B1 * | 12/2002 | Getchius et al. ............. | 715/210 |
| 6,578,056 | B1 * | 6/2003 | Lamburt ...................... | 715/205 |
| 6,654,758 | B1 * | 11/2003 | Teague ........................ | 707/101 |
| 6,704,727 | B1 * | 3/2004 | Kravets ......................... | 707/5 |
| 7,424,501 | B2 * | 9/2008 | Macy, Jr. ..................... | 708/300 |
| 2002/0033844 | A1 * | 3/2002 | Levy et al. ................... | 345/744 |
| 2002/0069218 | A1 * | 6/2002 | Sull et al. ................ | 707/501.1 |

OTHER PUBLICATIONS

Calishain, Tara. "Google Hacks, 2nd Edition." Publisher: O'Reilly; Copyright Date: Dec. 2004.*
Microsoft Windows XP—Copyright 2001.*
Flamenco Search—UC Berkeley. http://bailando.sims.berkeley.edu/flamenco.html. Last accessed Mar. 3, 2008.
ICDL—International Children's Digital Library. U of Maryland. http://www.icdlbooks.org/. Last accessed Mar. 3, 2008.
The Mac Orchard. Macintosh Older Protocols Software. http://www.macorchard.com/gopher.html. Last accessed Mar. 3, 2008.
Mspace. University of Southampton. http://mspace.ecs.soton.ac.uk/. Last accessed Mar. 3, 2008.

(Continued)

*Primary Examiner*—Stephen S Hong
*Assistant Examiner*—Soumya Dasgupta
(74) *Attorney, Agent, or Firm*—Lee & Hayes, PLLC

(57) ABSTRACT

A search engine user interface that reduces the need for explicit search rules; dynamically responds as user input is entered to give immediate feedback to a user; is not limited to searching data residing in a single store; and may be used with a plurality of search engines, is provided. The search engine user interface provides search functions for a plurality of types of file metadata and types of file content. The search engine user interface provides an active query box, query editing, word-wheeling, and query narrowing and broadening. The user interface provides accordion behavior for visual elements of the user interface, integrated custom tagging, multiple independent search parameters, and filtering and integrated custom tagging in a common file dialog box.

17 Claims, 18 Drawing Sheets

OTHER PUBLICATIONS

Presto—Papers from the Placeless Documents Project. http://www2.parc.com/csl/projects/placeless/papers/. Last accessed Mar. 3, 2008.

Dornfest, Rael, "Google Your Desktop", http:www.oreillynet.com/lpt/a/5284. Oct. 14, 2004.

* cited by examiner

Fig. 3.

| Title | Date | Author | Tags | Path |
|---|---|---|---|---|
| | | Future | | |
| Melissa's Bike | 3/11/2005 | | | /Daniel Robbin... |
| | | Last 7 days | | |
| Matching Bikes... | 2/15/2005 | | | D:\dcr_data\pe... |
| C[1].htm (bike... | 2/15/2005 | | | C:\INTERNET... |
| C[1].htm (bike... | 2/15/2005 | | | C:\INTERNET... |
| | | Show more results (3) | | |
| | | Last 30 days | | |
| om_bike[1].js | 2/9/2005 | | | C:\INTERNET... |
| 94.9 KUOW: b... | 2/9/2005 | | | C:\INTERNET... |
| Bike Online... | 2/9/2005 | | | C:\INTERNET... |

- 145 — biking [Clear] [10 results] [Go]
- 250 — Last 30 days
- 255 — Favorites / Filter by Date: Today, Yesterday, Last 7 days, Last 30 days, Custom...

Tags
Path
People
Type

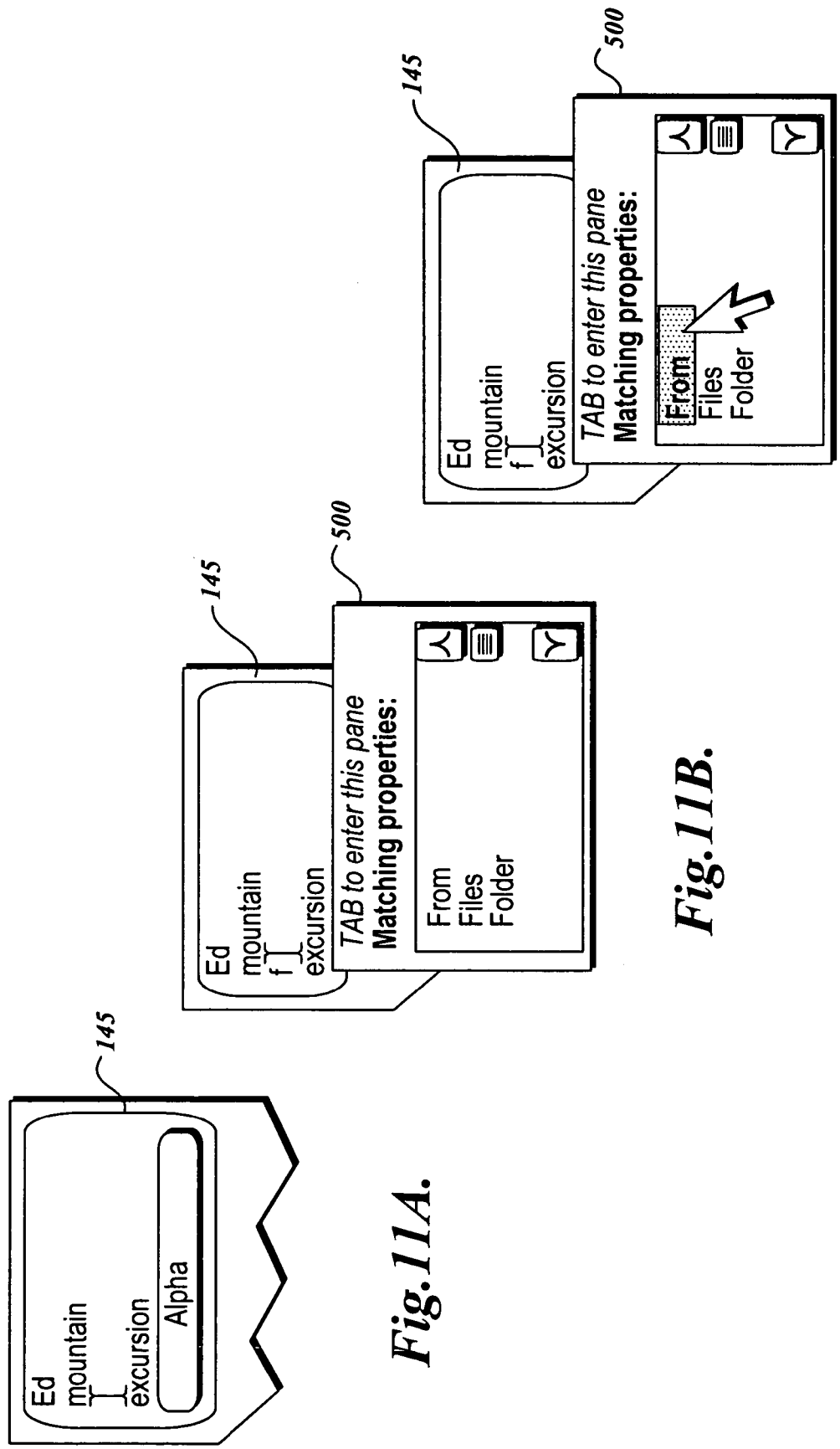

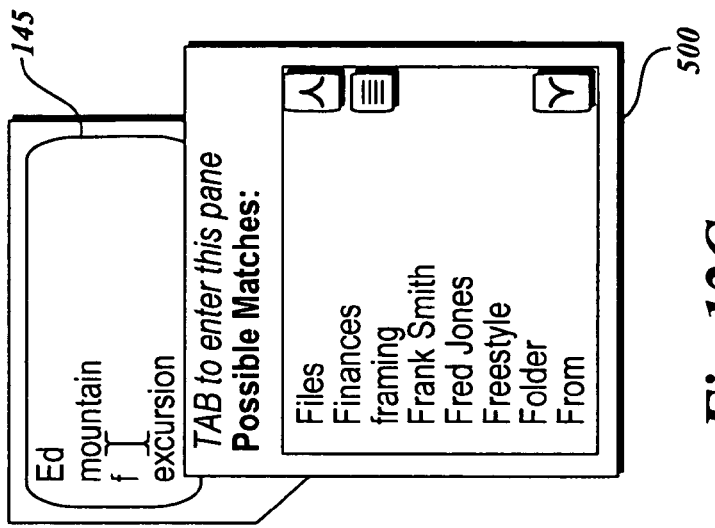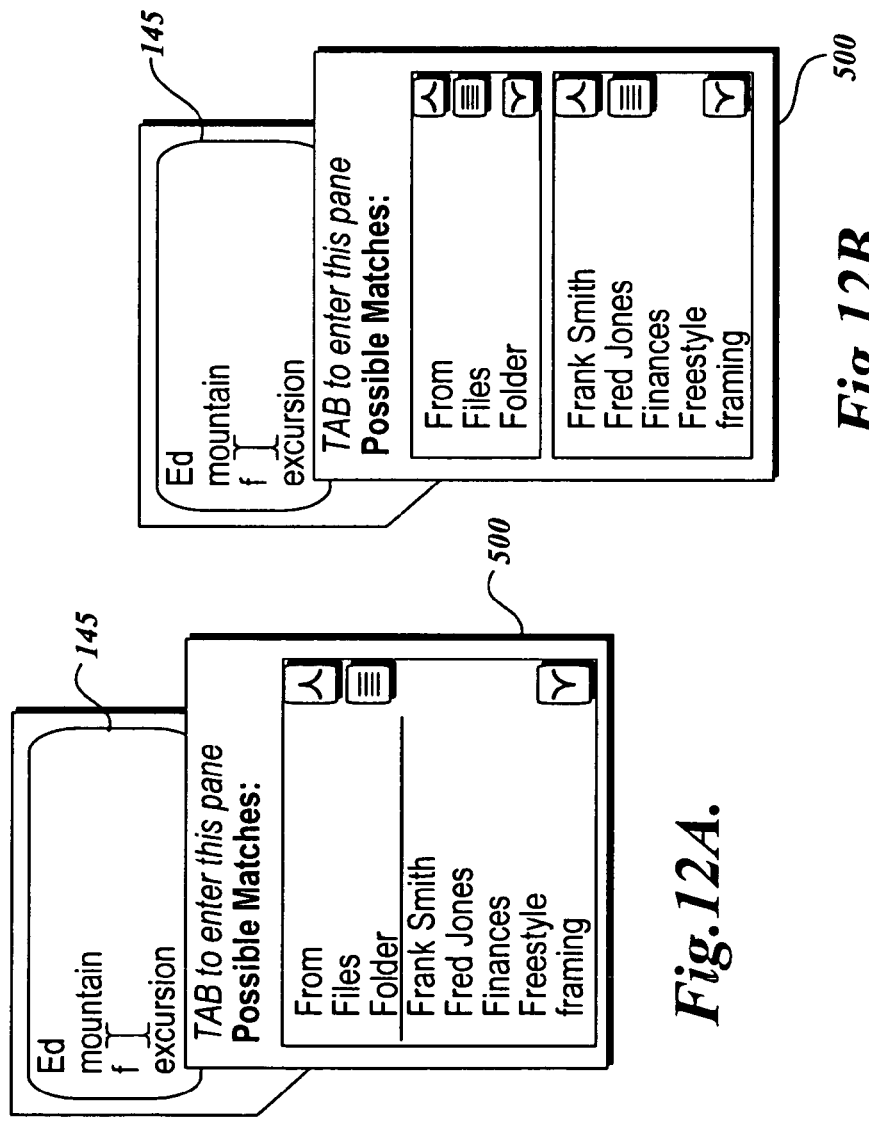

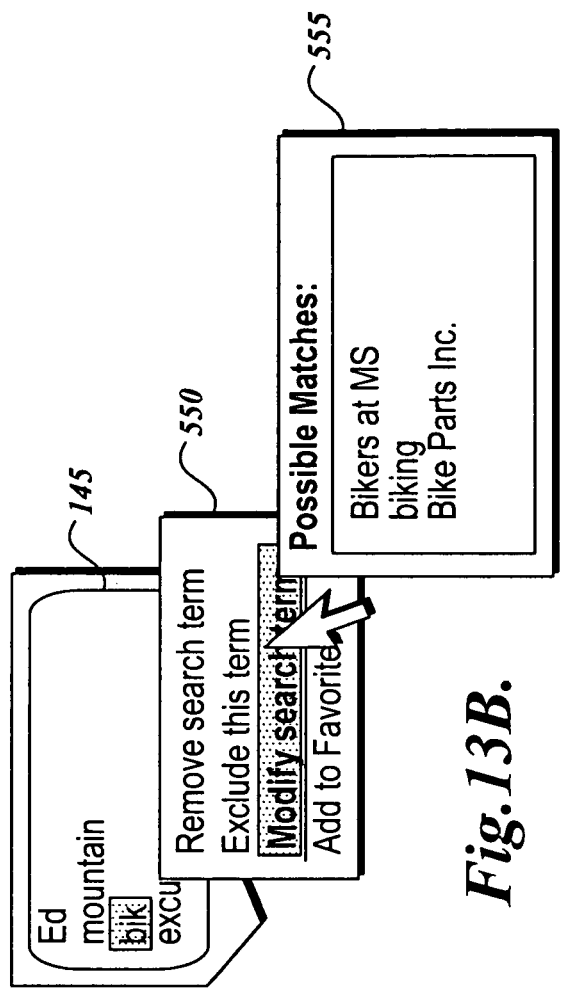
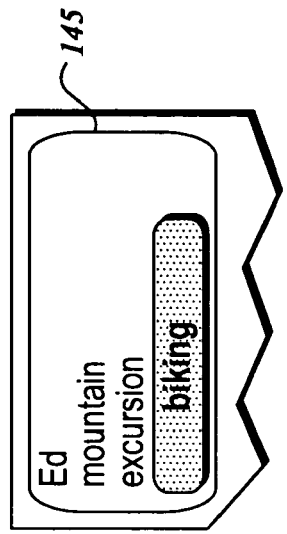
*Fig.13A.*
*Fig.13B.*
*Fig.13D.*
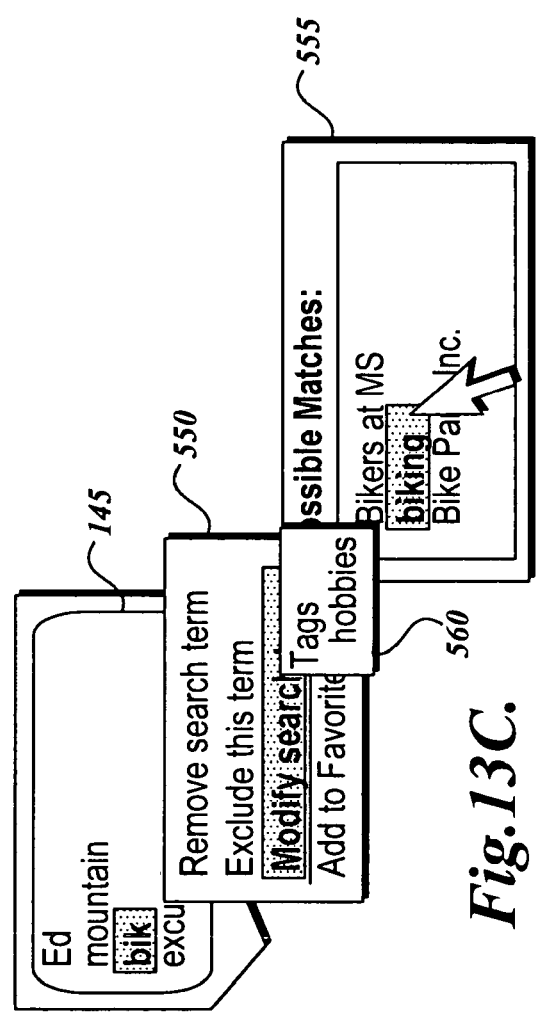
*Fig.13C.*

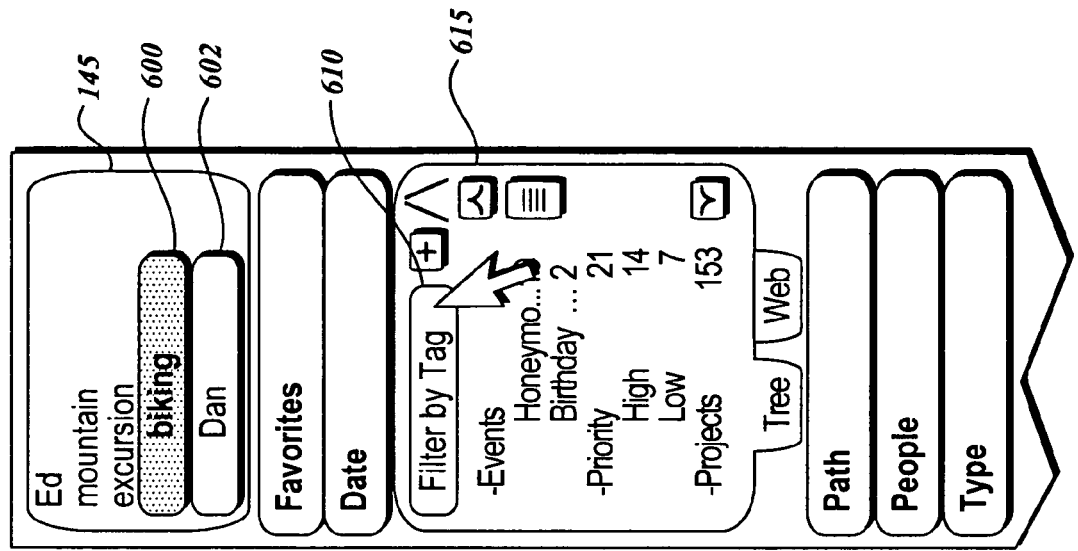
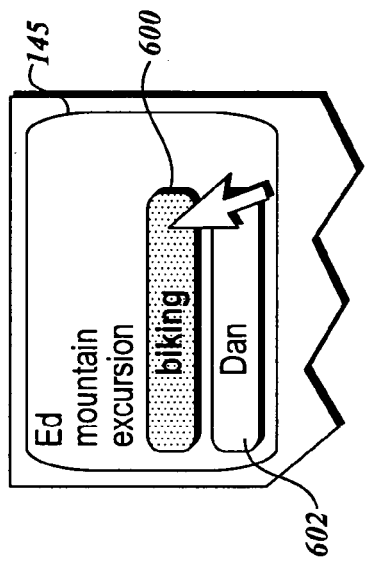
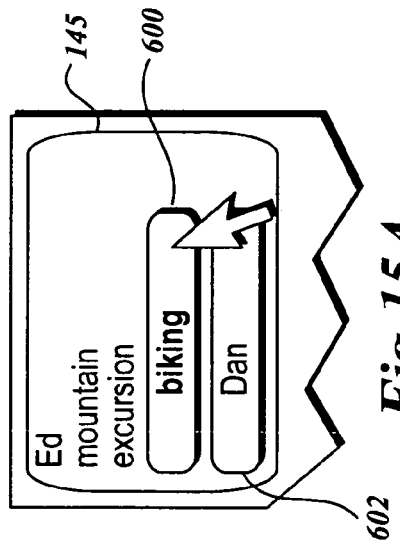
*Fig.15C.*
*Fig.15B.*
*Fig.15A.*

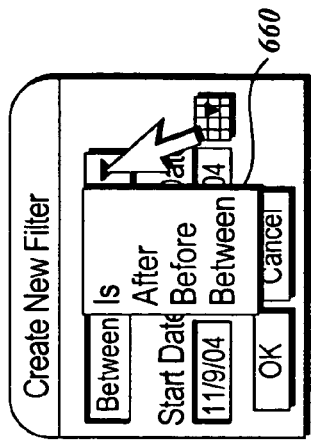
*Fig.17A.*
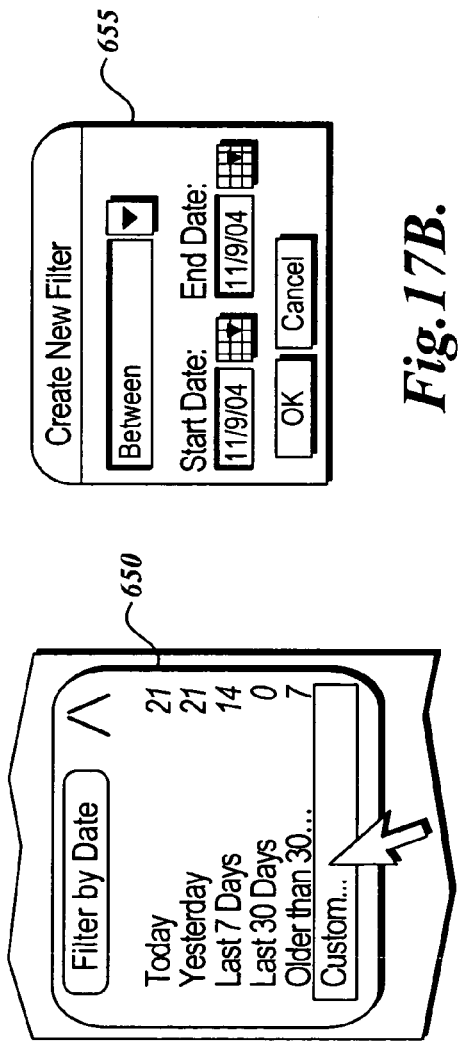
*Fig.17B.*
*Fig.17C.*
*Fig.17D.*
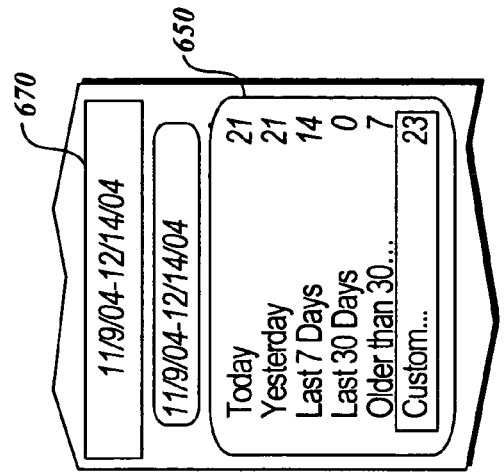
*Fig.17E.*
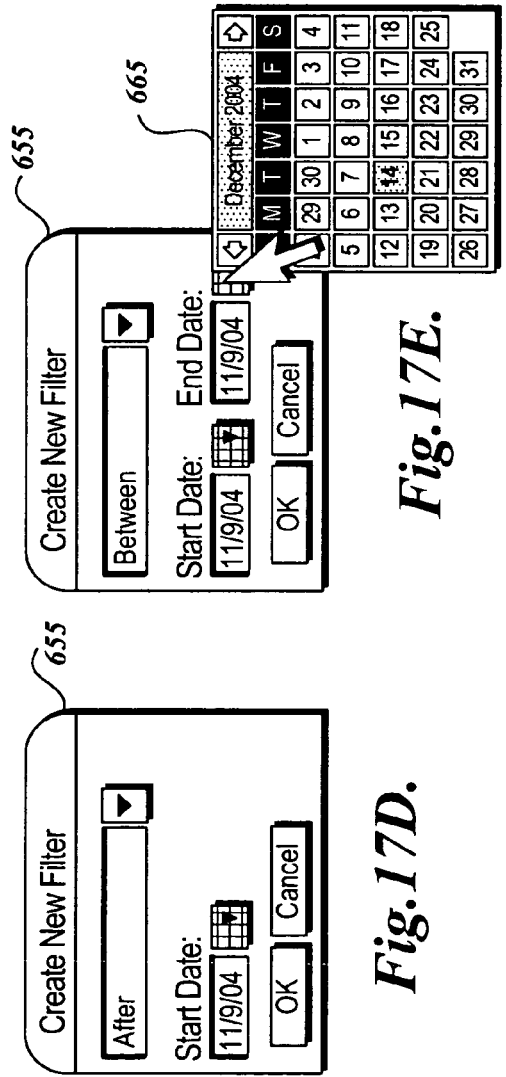
*Fig.17F.*

LOCAL SEARCH ENGINE USER INTERFACE

TECHNICAL FIELD

The present invention relates to user interfaces, and more particularly, to user interfaces for searching a body of information.

BACKGROUND

A software module called a "search engine" is often used to search for particular data in a body of data on a computing device. While it is possible to programmatically access and use a search engine, it is preferable to access and use a search engine through a user interface, i.e., a search engine user interface. In the past, most search engine user interfaces have been designed to interface with the kinds of files specific to particular application programs. For example, to find Microsoft® Word files, the search engine user interface in Microsoft Word is used. While the Microsoft Word search engine user interface is easy to learn and use, it is designed to search files specific to Microsoft Word.

An example of a more general purpose search engine user interface is a Web search engine user interface such as the Web search engine user interface included in Microsoft Internet Explorer. Typically, a Web search engine user interface comprises a text box in which searchable terms are entered, a button to launch a search, and an area to display the results of a search. A Web search engine user interface has the advantage of enabling searches of a plurality of different files. Since most users are comfortable with entering searchable terms into a text box, a Web search engine user interface is fairly easy to use for simple searches. If a simple search fails to return useful data or returns too much data, a more complex search is required. Complex searches involve using formal queries to retrieve data. A formal query is a set of instructions written in a well-defined query language using strict rules of composition. A formal query is assembled in a search engine user interface and submitted to the search engine. The search engine uses the formal query to find data the user has described in the formal query. The search engine returns the data to the search engine user interface so the user can view the data. If the user understands the query language and composition rules, a well-formed query is composed and the search is usually successful. When the search is not successful, it is often difficult for the user to discern what parts of the formal query need to be modified to achieve satisfactory results.

A user may have difficulty composing a formal query or discerning which parts of a formal query to modify because the query language and composition rules do not adequately represent how a user thinks about how to search for data of interest to the user. A user typically searches for data according to properties of the data that the user can recall. The properties of the data the user can recall may or may not be searchable, or may or may not be made available in the search engine user interface. For example, one user may remember a time span during which an e-mail was received while another user may remember a key phrase included in the subject line or body of the e-mail. If time span is one of the searchable properties employed by the search engine user interface, but key phrase is not one of the criteria, the user who remembers only the key phrase is not able to compose a query suitable for retrieving the e-mail message. Alternatively, if key phrases is one of the properties employed by the search engine user interface, but not time span, the user who remembers the key phrase can compose a suitable query, but not the user who only remembers the time span.

Often, searchable properties, such as the aforementioned exemplary searchable properties, may be employed by one search engine user interface but not by another search engine user interface. This limitation may require a user to use more than one search engine user interface to conduct a search and coordinate the results of searches. Using more than one search engine user interface is undesirable because of the additional time required and because users are required to learn the nuances of a plurality of search engine user interfaces.

Even if a user understands the query language and composition rules of a search engine user interface, a user may have difficulty discerning which parts of a formal query to modify because the search engine user interface does not respond quickly enough or because the results of the search do not match the user's expectations. For example, a user may generate a query containing the phrase "electric car" intending to find information on electric automobiles. If, after 15 seconds the search engine user interface has not returned any results, the user may stop the search, believing the search to be unsuccessful, and check the spelling of "electric car." If the user decides "electric car" is spelled correctly, the user will restart the search. In this example, after 30 seconds, the search engine user interface may respond with data having to do with radio controlled toy cars, electric golf carts, and electric automobiles. It may be difficult for the user to decide how to modify the query to increase the specificity of the information returned and/or speed up the response. Another drawback to contemporary Web search engine user interfaces is that the returned information usually comprises Universal Resource Locators (URLs) and summaries of the files with little information to help the user understand how the files relate to the user's original request for information.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

A user interface for searching a body of information, i.e., a search engine user interface, is provided. Depending on a specific form or embodiment, the search engine user interface reduces the need for explicit search rules; dynamically responds as user input is entered to give immediate feedback to a user; is not limited to searching data residing in a single store; and may be used with a plurality of search engines.

In one exemplary form, the search engine user interface provides search functions for a plurality of types of file metadata and types of file content.

In another exemplary form, the search engine user interface provides an Active Query Box, query editing, wordwheeling, and query narrowing and broadening.

In a further exemplary form, the search engine user interface provides accordion behavior for visual elements of the user interface, integrated custom tagging, multiple independent search parameters, and filtering and integrated custom tagging in the common file dialog box.

As will be readily appreciated from the foregoing description, depending on form or embodiment, the search engine user interface reduces the need for explicit search rules; dynamically responds as user input is entered to give immediate feedback to a user; is not limited to searching data residing in a single store; and may be used with a plurality of search engines.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 3 is an exemplary search engine user interface showing an active filter in an Active Query Box and an open Date property pane;

FIG. 11A is an exemplary Active Query Box containing four text lines with one word in each of lines 1, 2, and 4 and line 3 blank;

FIG. 11B is an exemplary Active Query Box overlapped by an exemplary Matching Properties pane, the Active Query Box containing four text lines with one word in each of lines 1, 2, and 4 and line 3 containing one letter;

FIG. 11C is an exemplary Active Query Box overlapped by an exemplary Matching Properties pane having one word highlighted, the Active Query Box containing four text lines with one word in each of lines 1, 2, and 4 and line 3 containing one letter;

FIG. 12A is an exemplary Active Query Box overlapped by an exemplary Possible Matches pane containing text in two sections beginning with the letter "F", the Active Query Box containing four text lines with one word in each of lines 1, 2, and 4 and line 3 containing one letter;

FIG. 12B is an exemplary Active Query Box overlapped by an exemplary Possible Matches pane containing text beginning with the letter "F", the Active Query Box containing four text lines with one word in each of lines 1, 2, and 4 and line 3 containing one letter;

FIG. 12C is an exemplary Active Query Box overlapped by an exemplary Possible Matches pane containing text beginning with the letter "F", the Active Query Box containing four text lines with one word in each of lines 1, 2, and 4 and line 3 containing one letter;

FIG. 13A is an exemplary Active Query Box overlapped by an exemplary Command pane;

FIG. 13B is an exemplary Active Query Box overlapped by an exemplary Command pane that is overlapped by an exemplary Possible Matches pane;

FIG. 13C is an exemplary Active Query Box overlapped by an exemplary Command pane that is overlapped by an exemplary Possible Matches pane that is overlapped by an exemplary Tags pane;

FIG. 13D is an exemplary Active Query Box containing a highlighted active filter;

FIG. 15A is an exemplary Active Query Box containing two highlighted active filters and an arrow cursor that points to the top highlighted active filter;

FIG. 15B is an exemplary Active Query Box containing two highlighted active filters with the top highlighted active filter outlined with a heavier outline and an arrow cursor that points to the top highlighted active filter;

FIG. 15C is an exemplary search pane containing an exemplary Active Query Box containing two highlighted active filters, one of which has a heavier outline, an exemplary open Tags property pane overlapped by an arrow cursor, and property tiles;

FIG. 17A is an exemplary Date property pane in which one text line is boxed to which an arrow cursor points;

FIG. 17B is an exemplary Create New Tag dialog box;

FIG. 17C is an exemplary Create New Tag dialog box with a combo box menu activated;

FIG. 17D is an exemplary Create New Tag dialog box without an End Date field;

FIG. 17E is an exemplary Create New Tag dialog box overlapped by a calendar pane that is overlapped by an arrow cursor;

FIG. 17F is an exemplary search pane containing a text box containing a date range and an exemplary Date property pane in which one text line is boxed;

DETAILED DESCRIPTION

Embodiments of the invention provide a method and apparatus, i.e., a search engine user interface, that reduces the need for explicit search rules; dynamically responds as user input is entered to give immediate feedback to a user; is not limited to searching data residing in a single store; and may be used with a plurality of search engines. Although search engine user interfaces described herein primarily include visual user interface elements, search engine user interfaces may also include aural and/or tactile user interface elements. Thus, the inclusion of visual user interface elements in the following description should be construed as exemplary and not as limiting. Search engine user interfaces described herein are used to construct and execute "searches" of a body of searchable data, i.e., a corpus. For example, a corpus often comprises a plurality of files having a plurality of file content types. A "search" comprises a reference to the corpus; the criteria used to search the corpus, i.e., the search criteria; and the results of the search. The reference to the corpus may be implicit or explicit. Search engine user interfaces described herein are applied to a body of searchable data, i.e., a corpus, on a computing device on which the search engine resides. Other search engine user interfaces may be applied to other corpora, e.g., a corpus accessed via a network. Thus, the application of search engine user interfaces to a corpus on a computing device on which a search engine resides should be construed as exemplary and not limiting. Search criteria are used to extract a subset of data from a corpus. Another aspect of search criteria is the ability to narrow the extracted data subset, i.e., filter the data subset. A filter is applied to the extracted subset of corpus data to yield the results of the search.

In implementations of user interface elements it is often preferable to accompany or replace text elements with icons. Icon imagery, shape, color, etc. may vary from implementation to implementation. Thus, icon imagery and usage, e.g., as illustrated in FIGS. 1 through 17F, should be construed as exemplary and not limiting.

Figure 1:
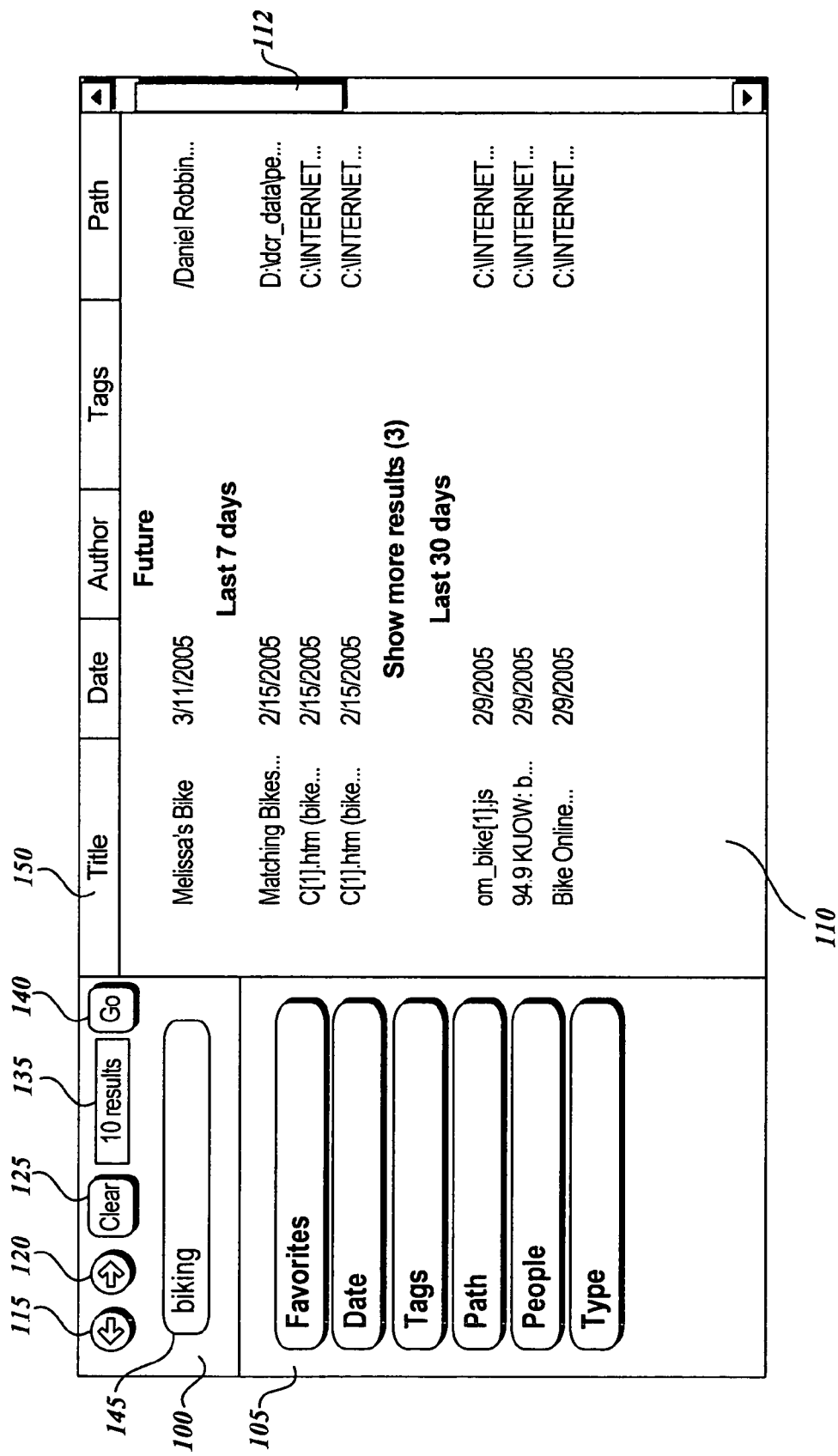
FIG. 1 is an exemplary search engine user interface.

The exemplary search engine user interface described herein is a graphical user interface (GUI) comprising GUI elements such as buttons, menus, fields, and the like presented in a window, i.e., a visually bounded area of a computer display dedicated to presenting the graphic user interface (GUI) elements of a computer program. The exemplary window as shown in FIG. 1, is divided into three visually bounded areas, i.e., panes: a query pane 100; a property tiles pane 105; and a results pane 110. The query pane 100 contains a Backward button 115, a Forward button 120, a Clear button 125, a Result Tally field 135, a Go button 140, and an Active Query Box 145. An Active Query Box is an editable text field that contains items that define the current state of a query including, but not limited to, searchable text terms and active filters. The property tiles pane 105 contains six exemplary property tiles: Favorites, Date, Tags, Path, People, and Type. A property tile is a button that, when activated, i.e., clicked on, presents a property pane. Property panes present items, classified according to property, that may be used for filtering and may also be used for searching. The Active Query Box 145 and property tiles provide multiple independent search parameters. The results pane 110 contains a column header bar 150 and rows of text describing result items, i.e., files, aligned in the columns. The exemplary column header bar shown in FIG. 1 contains column headers: Title, Date, Author, Tags, and Path. For example, in the first row, the information about the first result item is: Title—"Melissa's Bike," Date—"Mar. 11, 2005," and Path—"/Daniel Robbin . . . ." There is no information in the Author and Tags columns. The rows of information are grouped by date. Each row group has a title above it: Future, Last 7 Days, and Last 30 Days. At the bottom of the row group "Last 7 Days," is text line "Show more results (3)." Such information is referred to as "metadata," i.e., data about a file as opposed to data contained in a file.

The aforementioned GUI elements are used to select search criteria, initiate searches, apply filters, and view the results of searches. For example, the word "biking" may be used in a search for documents related to the topic of biking. As shown in FIG. 1, the word "biking" is first entered, i.e., keyed, into the Active Query Box 145. Then, the Go button 140 is clicked causing a total count of result items to appear in the Result Tally field, i.e., "10 results," and the result items to appear in the results pane 110 shown in FIG. 1. Initially, a limited number of results, i.e., seven lines, appears in the Result pane. The text line "Show more results (3)" at the bottom of the row group "Last 7 Days," may be clicked to show the missing result items, since the missing three items occur in the "Last 7 Days" row group. In the query pane 100, the Backward button 115 and Forward button 120 are used to select a search from a set of previously executed searches. When the Backward button 115 is clicked, the previous search in the set of searches is presented to the user, i.e., search criteria, settings, and results from the previous search are presented. The search criteria, e.g., words, in the Active Query Box 145 replace the word "biking"; settings in the property panels controlled by the property tiles are changed to the settings of the selected search; and result items in the results pane 110 are replaced with the result items of the selected search. Similarly, when the Forward button 120 is clicked, the next search in the set of searches is presented. When either the Backward button 115 or Forward button 120 are "rolled over," i.e., when an arrow cursor is moved over either button, a drop-down arrow appears next to the rolled over button. If the drop-down arrow is clicked, a drop-down list of the names of previously defined searches appears. When a name is selected from the list, the search is presented. The Clear button 125 is used to clear entries from the Active Query Box 145. On the right side of the results pane 110 is a scroll bar to enable scrolling the contents of the results pane 110. Activities involving the Active Query Box change queries submitted to a search engine and thus provide query editing. The Active Query Box 145 may also be used to enter explicit formal search queries.

Figure 2C:
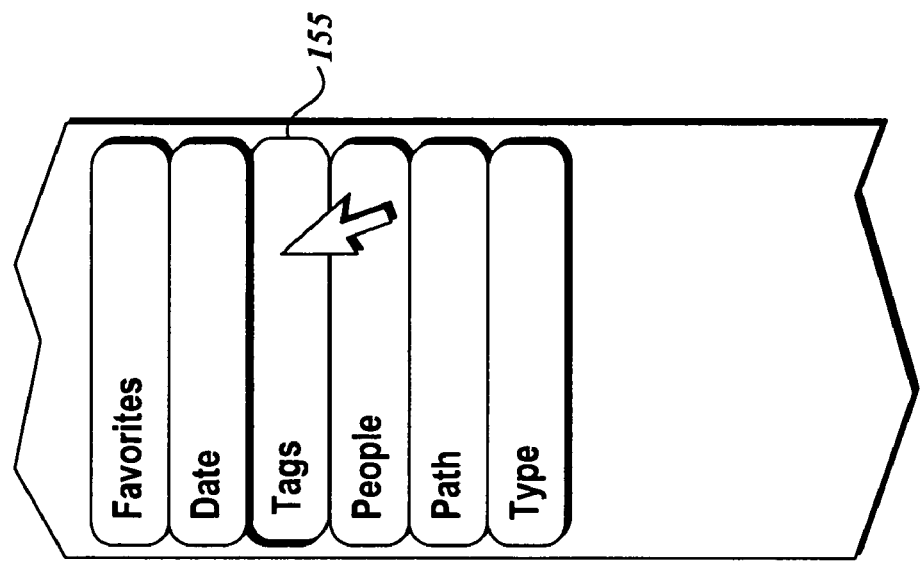
FIG. 2C is the exemplary set of property tiles shown in FIG. 2A, one of which is shown as "depressed"
Figure 2B:
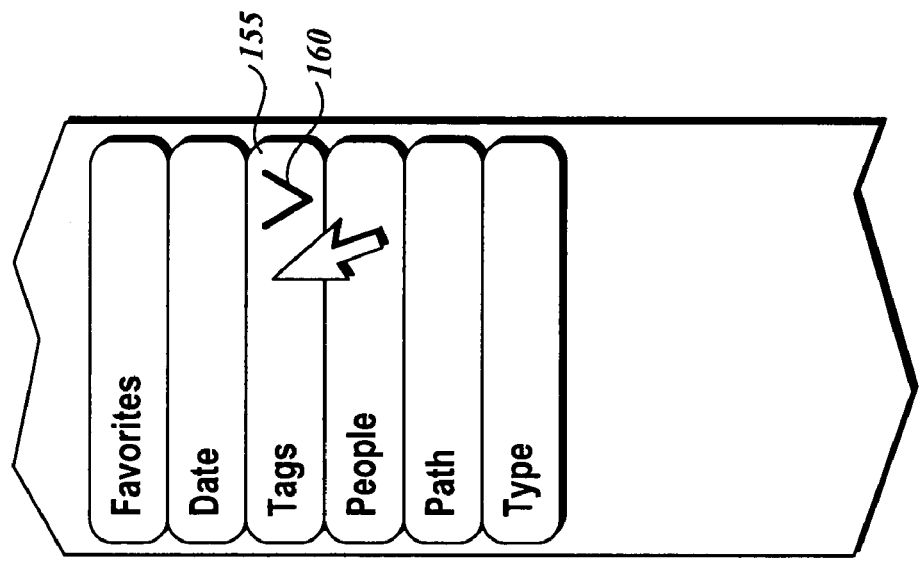
FIG. 2B is the exemplary set of property tiles shown in FIG. 2A, one of which displays an icon indicating that the property tile can be opened.
Figure 2A:
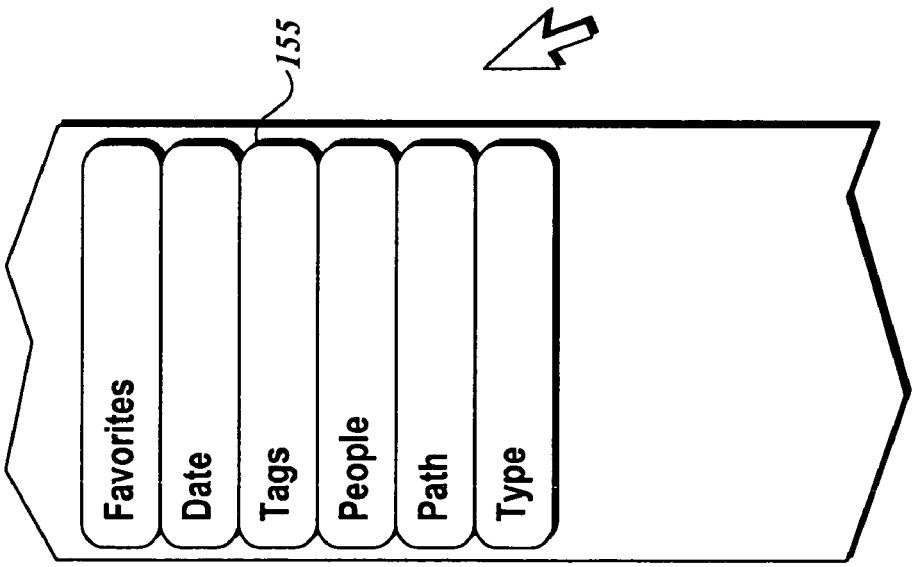
FIG. 2A is an exemplary set of property tiles.

As previously mentioned, when a property tile is clicked, a property pane is presented. Property panes provide filtering. The process of clicking a property tile to present a property pane is illustrated in FIGS. 2A through 2D. In FIG. 2A, the Tags property tile 155 is shown in the normal, i.e., unclicked, state. In FIG. 2B the arrow cursor is rolled over the Tags property tile 155 causing an "open" icon 160 to appear on the right side of the tile. In FIG. 2C the Tags property tile 155 is clicked causing the "open" icon to disappear and causing the property tile 155 to appear depressed until the mouse button is released. When the mouse button is released, the Tags property tile "opens," i.e., is replaced by the Tags property pane 200 shown in FIG. 2D.

Figure 2D:
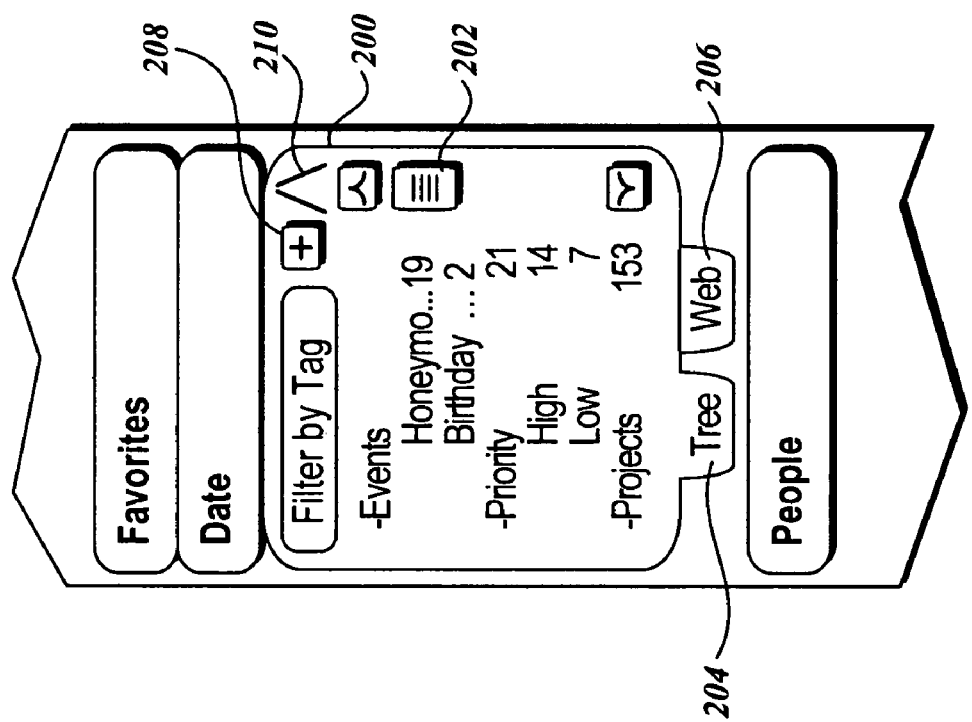
FIG. 2D is a part of the exemplary set of property tiles shown in FIG. 2A, one of which is opened, i.e., expanded to display a property pane that provides further functions.

In FIG. 2D, exemplary property tiles are shown along with an exemplary Tags property pane 200. The Favorites and Date property tiles are at the top of FIG. 2D. Below the Date property tile is the Tags property pane. Note that the invitational text "Filter by Tag" helps identify the property pane as the Tags property pane. Invitational text is text that appears in an editable text field and suggests a course of action to the user. The user may delete the invitational text from the text field and enter other text. Below Tags property pane 200 is the People property tile. Note that the property tiles below the Tags property tile are shifted down to make room for the Tags property pane. This shifting behavior is called "accordion behavior" and enables the elements, i.e., tiles and panes, in the property tiles pane 105 to vertically resize and change position to make full use of the vertical space available in the property tile pane. As property tiles are opened, i.e., expanded into property panes, and property panes are closed, i.e., collapsed into property tiles, the vertical dimension of each tile and pane is adjusted to give each tile and pane an adequate portion of the room available in the property pane. Accordion behavior may also be applied to horizontal dimensions. The use of vertical accordion behavior should be construed as exemplary and not limiting.

The GUI elements in the Tags property pane are used to create tags and associate the tags with selected items, e.g., selected files. A tag is a user created label, i.e., a piece of user created metadata, that identifies a file as belonging to a group of files. For example, files having to do with winemaking, i.e., winemaking files, are distributed throughout the file system of a computing device, i.e., winemaking files exist in more than one directory of the file system. A tag named "winemaking" is created and associated with each of the winemaking files. Thereafter, the winemaking files can be extracted from a corpus or filtered from a data subset using the winemaking tag while allowing the files to remain in the original directories or be moved to other directories. Normally the files in tag group have one or more common attributes, e.g., winemaking, but a tag may be applied across an arbitrary group of files. Preferably, in an embodiment of the invention, user created metadata items, i.e., tags, are searched in the same way as system created metadata.

In FIG. 2D, at the top of the Tags property pane 200 is a text field containing the invitational text "Filter by Tag." In the Tags property pane 200 the text field is used to choose a tag which is used to filter the results of the search by tag. Beneath the text field is a tag list indented according to type. The illustrated exemplary types of tags are: Events, Priority, and Projects. The tags beneath the Events type are: Honeymo . . . (Honeymoon) and Birthday. The tags beneath the Priority type are: High and Low. The tags beneath the Priority type are hidden. The tags and tag types shown in FIG. 2D are exemplary and should not be construed as limiting. To the right of the tag list are scrolling controls 202 for scrolling the tag list. Below the tag list are two tabs, Tree 204 and Web 206, that are used to set the visual organization of the tag list. In FIG. 2D, the Tree tab 204 is selected so the tag list appears as a hierarchical tree. If the Web tab 206 were selected, the tag list appears as web of properties and the objects with which the properties are associated. The Tree and Web tabs and the visual organization associated with the tabs are exemplary and should not be construed as limiting. In the upper right corner of the Tags property pane 200 is a Create New Tag button 208 labeled with a plus symbol (+). Clicking the Create New Tag button 208 opens a series of panes used to create new tags that are then added to the tag list. The Create New Tag button 208 and associated panes provide integrated custom tagging. To the right of the Create New Tag button 208 is the Close button 210 labeled with an inverted V (ˆ). Clicking the Close button 210 causes the Tags property pane 200 to collapse into the Tags property tile 155.

The Tags property pane described above provides integrated custom tagging. Integrated custom tagging may also be provided by placing GUI elements similar to the Tags property pane GUI elements in common file dialog boxes.

FIG. 3 illustrates the results of a search using a search word "biking" and an active query filter 250 containing the words "Last 30 days." Active query filters such as active query filter 250 are placed into the Active Query Box in the manner illustrated in FIGS. 16A through 16E and described below. FIG. 3 is similar to FIG. 1 in that FIG. 3 also illustrates a search engine user interface window; however, in FIG. 3, the Active Query Box 145 contains, in addition to the word "biking," an active query filter 250 containing the words "Last 30 days." Also note that in FIG. 3, a Date property tile has been expanded into the Date property pane 255. The Date property pane 255 contains a list of date specifiers: Today, Yesterday, Last 7 days, Last 30 days, and Custom . . . that may be used as filters. The specifier "Last 30 days" forms the active query filter, i.e., active filter, containing the words "Last 30 days." If a search is initiated, by clicking on the Go button, the contents of the results pane would be reduced to the list of items under the phrase "Last 30 days."

Figure 4:
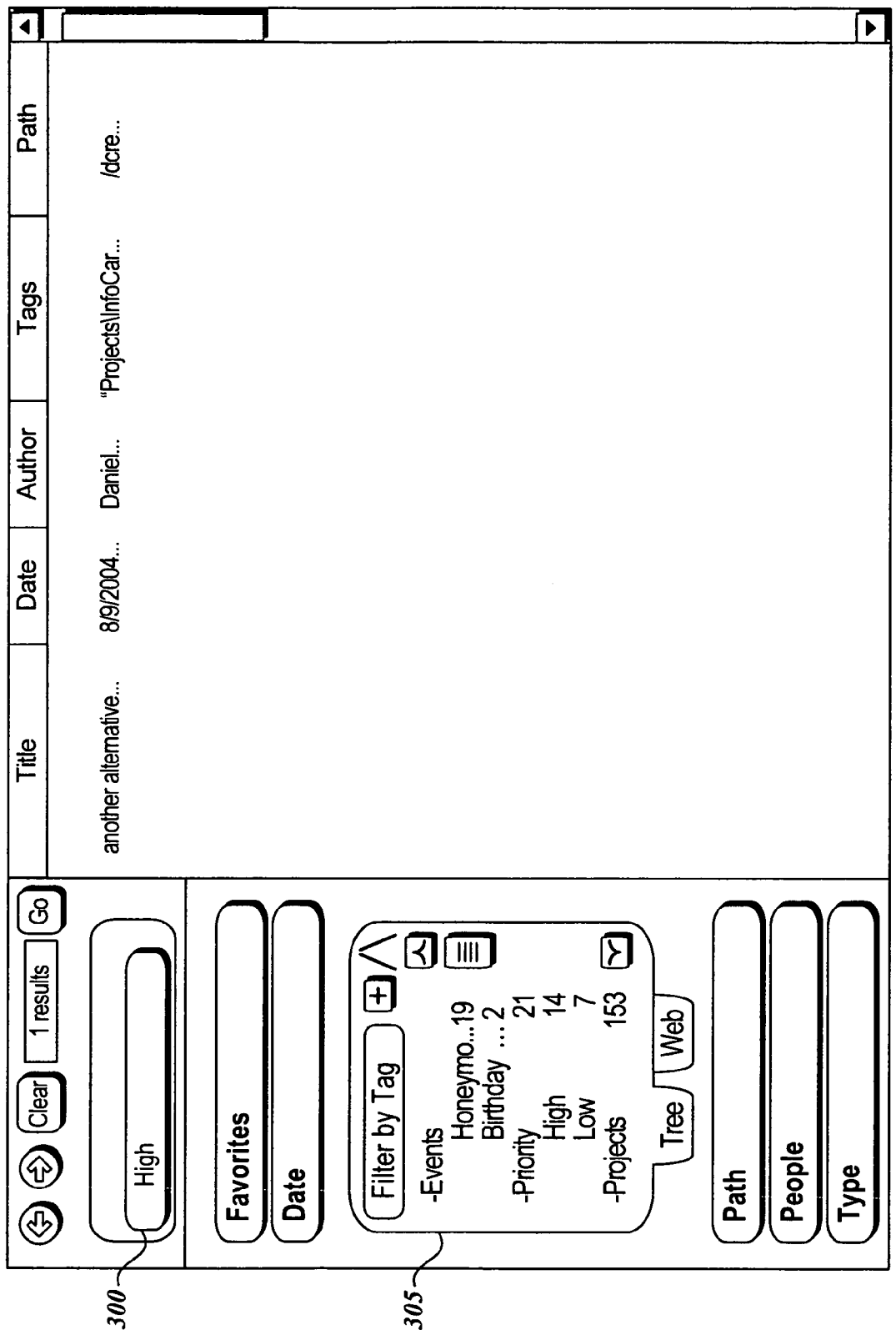
FIG. 4 is an exemplary search engine user interface showing an active filter in an Active Query Box and an open Tags property pane.

FIG. 4 illustrates the results of a search using only an active filter 300. FIG. 4 is similar to FIG. 1 in that FIG. 4 also illustrates a search engine user interface window; however, in FIG. 4 the word "biking" has been removed from Active Query Box. Instead, the Active Query Box contains an active filter 300 containing the word "High." The word "High" matches the "High" tag listed in a Tags property pane 305. The file listed in the results pane is the result of a search for files having the "High" tag.

Figure 5:
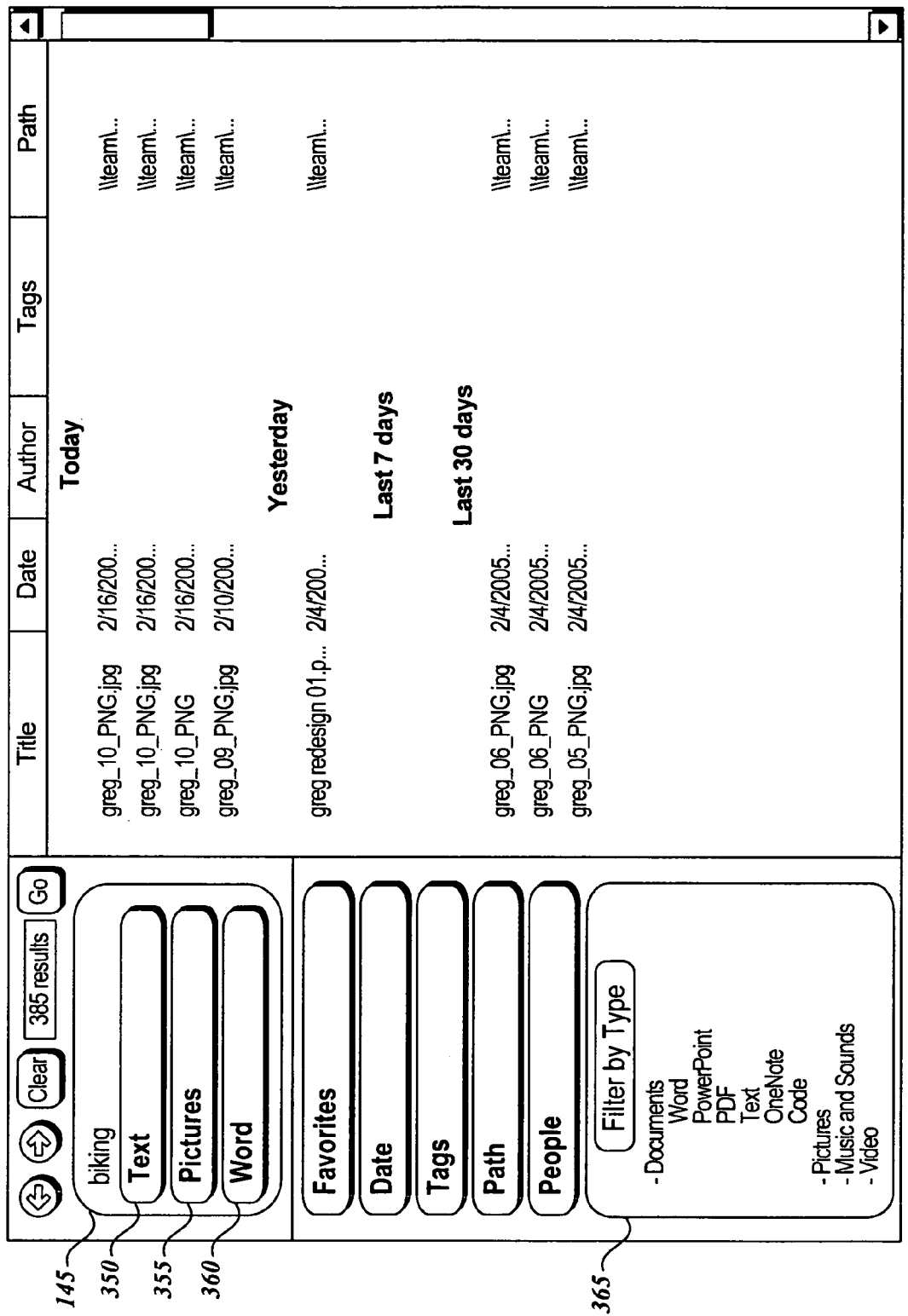
FIG. 5 is an exemplary search engine user interface showing three active filters in an Active Query Box and an open Type property pane.

FIG. 5 shows how multiple active filters may be applied to a search. FIG. 5 is similar to FIG. 1 in that FIG. 5 also illustrates a search engine user interface window; however, in FIG. 5 the Active Query Box 145 contains, in addition to the word "biking," a set of active filters: Text 350, Pictures 355, and Word 360. A Type property pane 365 contains four main types with subtypes below the main types. The main types listed in the Type property pane 365 are Documents, Pictures, Music and Sounds, and Video. The subtypes of the Documents type are Word, PowerPoint, PDF, Text, OneNote, and Code. Note that Text, Pictures, and Word are listed in the Type property pane 365 because the three active filters were selected from the list in the Type property pane 365. The search and filtering using the contents of the Active Query Box yields files that have to do with biking and are text, picture, or Word files. Obviously a wide variety of other types and subtypes are possible. Thus, the illustrated and described number and kind of types and subtypes should be construed as exemplary and not limiting.

Figure 6:
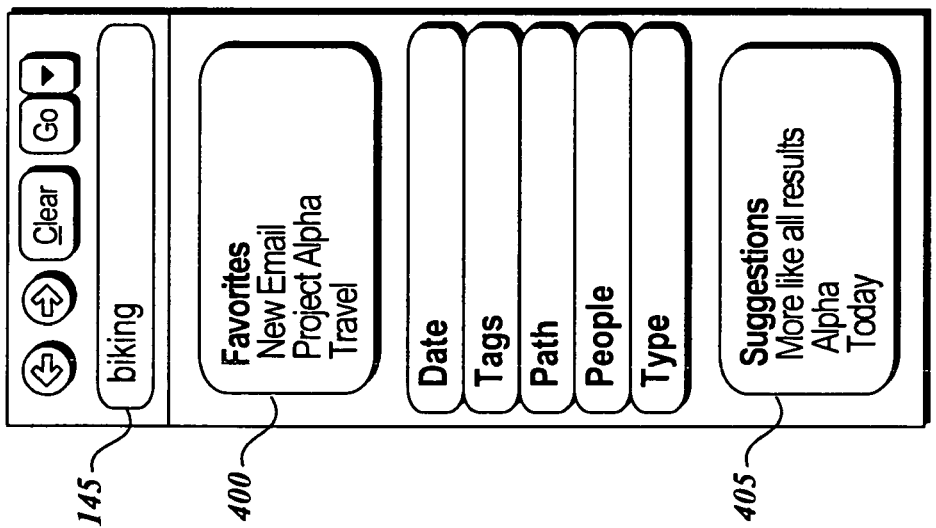
FIG. 6 is an exemplary search pane containing an open Favorites property pane and Suggestions pane.

FIG. 6 illustrates a Favorites property pane 400 used in conjunction with a Suggestions pane 405. FIG. 6 shows the query pane 100 and property tile pane 105 as illustrated in FIG. 1 and described above however; in FIG. 6, the Favorites property tile is expanded into the Favorites property pane 400. The Favorites property pane 400 lists three items: New E-mail, Project Alpha, and Travel. Below the remaining property tiles in a Suggestions pane 405. The Suggestions pane 405 contains three items: More like all results, Alpha, and Today.

Figure 7:
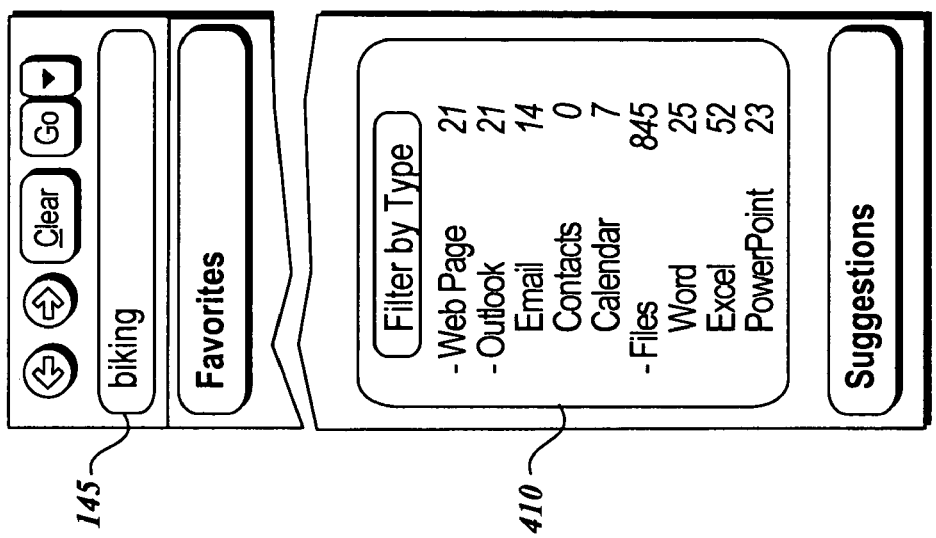
FIG. 7 is an exemplary search pane containing an open Type property pane and Favorites and a Suggestions property tiles.

FIG. 7 illustrates a Type property pane 410 including item totals after each item listed. For ease of display, only selected portions of the property pane are shown. Showing the item totals allows users to focus searches on those types that may be easier to search because there are fewer items of the specified type or on those types that may yield more results because there are more items of the specified type. The Type property pane 410 lists the types of items, subtypes, and the total number of each type and subtype of item. The types are: Web Page, 21; Outlook, 21, and Files 845. The subtypes of Outlook are: E-mail, 14; Contacts, 0; and Calendar, 7. The subtypes of Files are: Word, 25; Excel, 52, and PowerPoint, 23.

Figure 8:
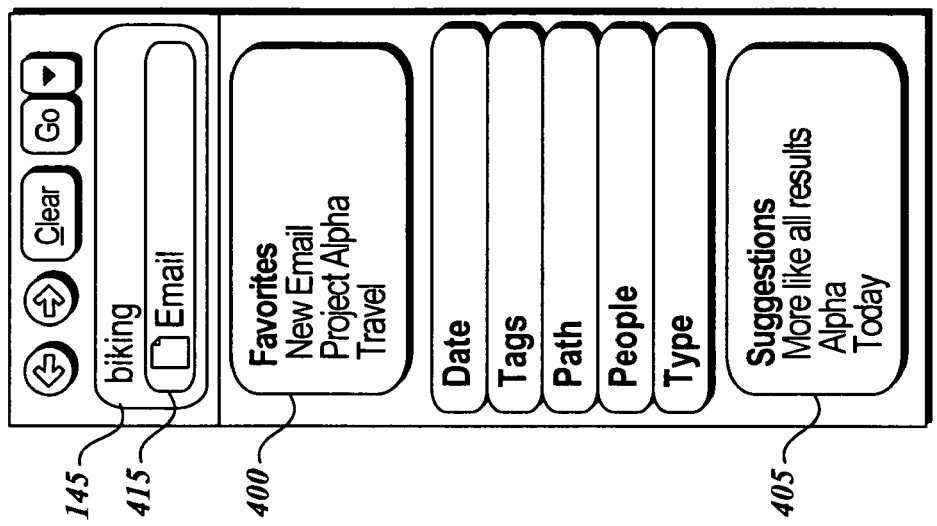
FIG. 8 is an exemplary search pane containing an Active Query Filter in an Active Query Box, an open Favorites property pane and a Suggestions pane.

FIG. 8 illustrates the Favorites property pane 400 used in conjunction with the Suggestions pane 405. FIG. 8 is similar to FIG. 6 in that FIG. 8 also illustrates the Favorites property pane; however, in FIG. 8 the Active Query Box 145 contains, in addition to the word "biking," the active filter Email 415. A search using the contents of the Active Query Box would yield emails related to biking.

The exemplary property panes discussed above provide filtering. Alternatively, filtering may be provided by placing property pane GUI elements in common file dialog boxes.

Figure 9A:
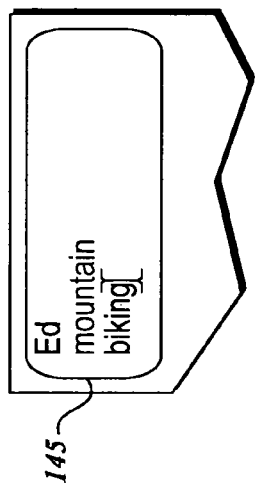
FIG. 9A is an exemplary Active Query Box containing two text lines with one word in each text line.
Figure 9B:
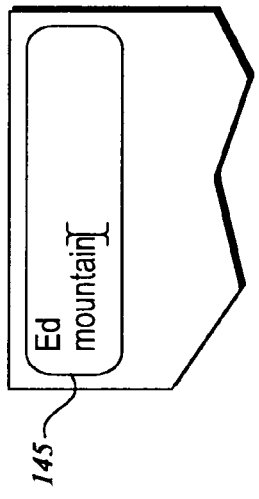
FIG. 9B is an exemplary Active Query Box containing three text lines with one word in each text line.

FIGS. 9A and 9B illustrate how searchable terms, i.e., terms, are entered into the Active Query Box 145. In FIG. 9A the term "Ed" is typed and appears in the first line of the Active Query Box 145. If a space is typed, the text insertion cursor, i.e., text cursor, in the Active Query Box 145 moves to a new line and a new term is started, i.e., "mountain." In FIG. 9B another space is typed, another new term is started, i.e., "biking." If the interior of the Active Query Box 145 is clicked, all of the text in the Active Query Box 145 is selected. If clicked again, the text is deselected and the text cursor is placed at the position that was clicked, i.e., after "biking" in the illustrated example.

Figure 10A:
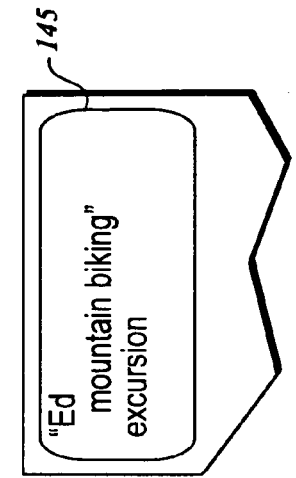
FIG. 10A is an exemplary Active Query Box containing four text lines with one word in each text line.
Figure 10B:
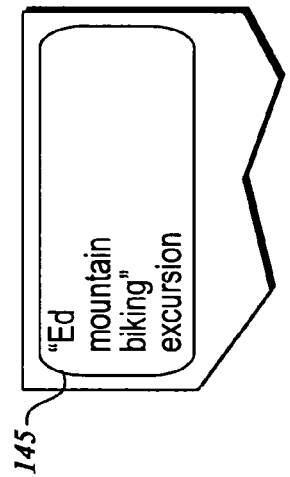
FIG. 10B is an exemplary Active Query Box containing four text lines with one word in each text line and quotes surrounding the words on lines 1 through 3.
Figure 10C:
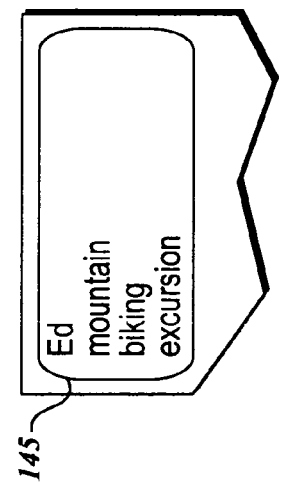
FIG. 10C is an exemplary Active Query Box containing three text lines with one word in the first line, two words in the second line, and one word in the third line and quotes surrounding the words on lines 1 and 2.
Figure 10D:
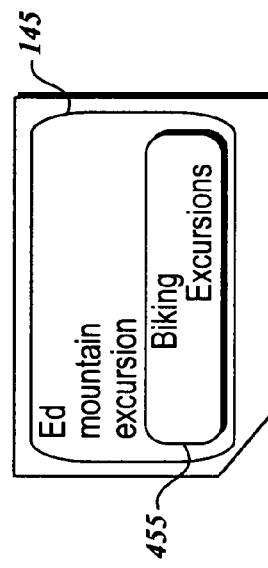
FIG. 10D is an exemplary Active Query Box containing three text lines with one word in each text line and an Active Query Filter.
Figure 10E:
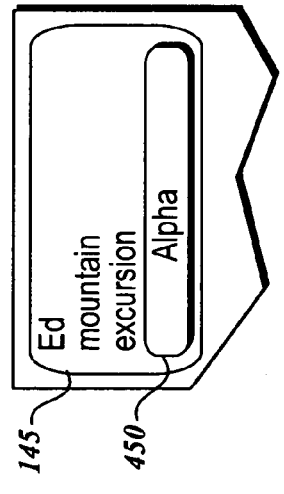
FIG. 10E is an exemplary Active Query Box containing three text lines with one word in each text line and an Active Query Filter containing two words.

FIGS. 10A through 10C illustrate how terms in the Active Query Box 145 are combined into phrases. FIG. 10A shows four terms in the Active Query Box 145: "Ed," "mountain," "biking," and "excursion." FIG. 10B shows the same terms as FIG. 10A but "Ed," "mountain" and "biking" are enclosed in quotes. After the terminating quote is entered, i.e., the quote after "biking," the terms are rearranged into the phrase "Ed mountain biking" as shown in FIG. 10C. If the Active Query Box 145 is not wide enough to accommodate the full phrase as a single text line, the phrase is broken across two or more text lines with the second and succeeding text lines indented as shown in FIG. 10C. The Active Query Box 145 in FIG. 10D contains the words "Ed," "mountain," and "excursion" and an active filter "Alpha" 450. Note that the active filter 450 is treated as another term. The Active Query Box 145 in FIG. 10E contains the terms "Ed," "mountain," and "excursion" and an active filter "Biking Excursions" 455. If the button enclosing an active filter is not wide enough to accommodate the full phrase in an active filter, the phrase is broken across two or more text lines with the second and succeeding text lines indented as shown in FIG. 10E.

FIGS. 11A through 11C show how new terms may be entered in the Active Query Box 145. FIG. 11A illustrates how a new term may be inserted at any point in the list of terms in the Active Query Box 145. The Active Query Box 145 in FIG. 11A contains the terms "Ed," "mountain," and "excursion" and an active filter "Alpha." The text cursor is placed at the end of the second line and a space is entered after the term on the second line. A new line is opened below the second line; the text cursor is automatically moved to the beginning of the new line, i.e., new third line; the previous third line is moved to the fourth line; and the active filter is also moved down.

When text is entered in a new text line, e.g., line three, a word-wheel pop-up 500 appears as shown in FIG. 11B. Word-wheeling is a process whereby a list of suggested words, i.e., terms, is dynamically gathered and presented as text is entered using the entered text as search criteria. As soon as one or more letters are entered, a word-wheel pop-up, i.e., word-wheel 500, containing the suggested terms appears near the Active Query Box 145. Text may continue to be entered in the Active Query Box 145 by keying in words or by word-wheeling, i.e., selecting a word from the word-wheel 500. As in FIG. 11A, the Active Query Box 145 shown in FIG. 11B also contains the terms "Ed," "mountain," and "excursion" but the third line contains the letter "f." When the letter "f" is entered, the word-wheel 500 appears. The word-wheel 500 contains instructions "TAB to enter this pane" and the title "Matching Properties:." Below the title "Matching Properties:" is a scrollable pane containing the terms "From," "Files" and "Folder."

If the tab key is pressed the text cursor in the Active Query Box 145 becomes inactive and the arrow cursor in the word-wheel 500 becomes active enabling the selection of a term from the list of terms in the scrollable pane. The contents of the scrollable pane may also be clicked directly to make a selection. FIG. 11C shows how such a selection is made. FIG. 11C is similar to FIG. 11B; however, in FIG. 11C, the term "From" is highlighted and overlapped by an arrow cursor. If the term "From" is clicked, the term "From" is added to the list of terms in the Active Query Box 145. If the term "From" is an active filter, "From" appears as an active filter in the Active Query Box 145.

FIGS. 12A through 12C show three possible embodiments of a word-wheel. FIGS. 12A through 12C show the same Active Query Box 145 contents as those in FIG. 11C; however, FIGS. 12A through 12C each show different word-wheel 500 contents. The word-wheel shown in FIG. 12A contains one scrollable pane containing the: "From," "Files," "Folder," "Frank Smith," "Fred Jones," "Finances,""Freestyle," and "Framing." There is a horizontal dividing line between "Folder" and "Frank Smith." The terms above the horizontal dividing line are Property Names. The terms below the horizontal dividing line are Property Values. The relationship between Property Names and Property Values is similar to the relationship between parameters and parameter values. A Property Name identifies a placeholder that may be replaced by one value from a set of possible values, e.g., "From" is a placeholder for a set of persons who may have sent email. A Property Value is a specific value, possibly from a set of values identified by a Property Name, e.g., "Fred Jones" may be a person in the set of persons who may have sent email. The word-wheel in FIG. 12B contains two scrollable panes. The top scrollable pane contains the terms: "From," "Files," and "Folder." The bottom scrollable pane contains the terms: "Frank Smith," "Fred Jones," "Finances," "Freestyle," and "Framing." In the top scrollable pane are Property Names. The terms in the bottom scrollable pane are Property Values. The word-wheel shown in FIG. 12C contains one scrollable pane containing terms that are interleaved Property Names and Property Values: "Files," "Finances," "Framing," "Frank Smith," "Fred Jones," "Freestyle," "Folder," and "From."

FIGS. 13A through 13D illustrate how a term is converted into a filter. In FIG. 13A, the Active Query Box 145 contains the terms "Ed," "mountain," "bik," and "excursion." The text cursor is positioned after the highlighted, i.e., selected, term "bik." A command menu 550 relating to terms overlaps the Active Query Box 145. The commands in command menu 550 are: "Remove search term," "Exclude this term," "Modify search term," and "Add to Favorites." If "Remove search term" is selected, the selected term, i.e., "bik," is removed from the Active Query Box and the lines are repositioned vertically to eliminate the blank line left by the removal of "bik." If "Exclude this term" is selected, a "NOT" is applied to the selected term, i.e., "bik" and a new search is conducted, i.e., a new search is conducted requesting content that does not contain the term "bik." As a result, all items appearing in the results pane 110 explicitly exclude the term "bik" in their content and metadata. If "Add to Favorites" is selected, the selected term is added to the list of favorite terms that appears in the Favorites property pane.

If "Modify search term" is selected, a word-wheel 555 appears overlapping the command menu 550 as shown in FIG. 13B. FIG. 13B is similar to FIG. 13A but also shows the highlighted, i.e., selected, "Modify search term" command overlapped by and arrow cursor that is overlapped by a word-wheel 555. The word-wheel 555 contains the title "Possible Matches:" and list of property values that are related to the selected term in the Active Query Box 145, i.e., "bik": "Bikers at MS," "biking," and "Bike Parts Inc." FIG. 13C is similar to FIG. 13B but also shows the term "biking" highlighted in the word-wheel 555 pointed to by an arrow cursor and a tooltip containing the words "Tags" and "hobbies." A tooltip is a small pop-up label providing descriptive text for an element in a GUI. When a GUI element is rolled over, the tooltip appears. Tooltips for terms in the word-wheel 555 help uniquely identify selected terms in the word-wheel 555 by providing the paths to each term as an indented list of hierarchical elements. For example, The tooltip in FIG. 13C shows that the selected term "biking" is in the sublist "hobbies" that is in the list of Tags. If there were another "biking" term in the word-wheel 555, the second "biking" term would have a different path than the "biking" term shown in FIG. 13C. A term in word-wheel 555 that is uniquely identified by a tooltip may then be selected. The selected term in word-wheel 555, e.g., "biking," becomes an active filter in Active Query Box 145. FIG. 13D shows Active Query Box 145 containing the terms "Ed," "mountain," excursion," and the highlighted active filter "biking" that was created by the process described above. By enabling the addition and removal of terms as described above, a search engine user interface provides query narrowing and broadening.

Figure 14C:
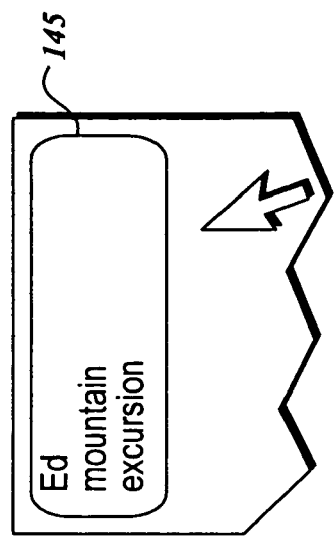
FIG. 14C is an exemplary Active Query Box overlapped by an arrow cursor.
Figure 14B:
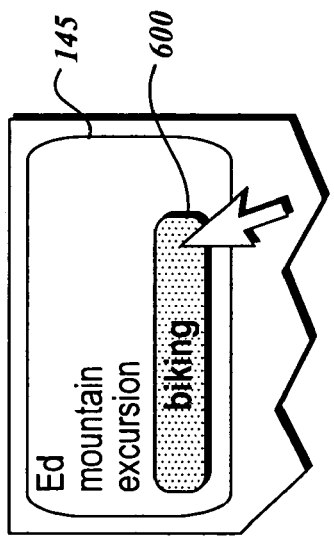
FIG. 14B is an exemplary Active Query Box containing a highlighted active filter to which an arrow cursor points.
Figure 14A:
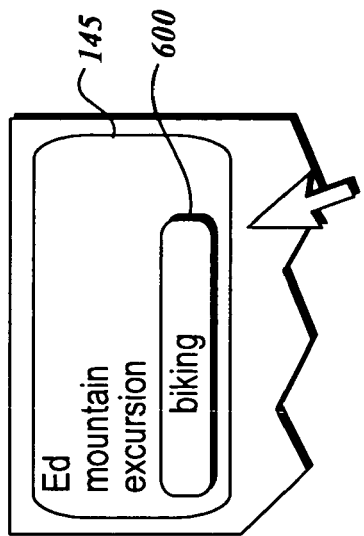
FIG. 14A is an exemplary Active Query Box overlapped by an arrow cursor and containing a highlighted active filter.

Depending on the implementation, an active filter may be removed from the Active Query Box 145 by clicking on the active filter, by pressing the Delete key while an active filter is selected, by clicking on a "close box" that may be available on the active filter or in any other manner known to those skilled in the art. FIGS. 14A through 14C illustrate how an active filter is removed from the Active Query Box 145 using the Delete key. In FIG. 14A the Active Query Box 145 contains the words "Ed," "mountain," and "excursion" and the highlighted active filter "biking" 600. An active filter in the Active Query Box 145 is highlighted, i.e., selected, by moving the arrow cursor over the active filter and clicking the active filter. The selected active filter "biking" 600 is shown in FIG. 14B. FIG. 14B is similar to FIG. 14A but also shows an arrow cursor overlapping the selected active filter "biking" 600. If the Delete key is pressed while an active filter, e.g. active filter "biking" 600, is selected, the active filter is removed from the Active Query Box 145 as shown in FIG. 14C.

FIGS. 15A through 15C show how an active filter is edited. FIG. 15A shows the Active Query Box 145 containing the terms "Ed," "mountain," and "excursion" and the active filters "biking" 600 and "Dan" 602. The arrow cursor is rolled over the active filter "biking" 600 causing the text in the active filter "biking" to become boldfaced. If the mouse button is pressed while the arrow cursor is over the active filter "biking" 600, the active filter "biking" 600 is highlighted as shown in FIG. 15B. If the mouse button is then released, the property pane associated with the property type of the filter is opened as shown in FIG. 15C. FIG. 15C shows, from top to bottom, the Active Query Box 145; property tiles Favorites and Date; property pane Tags; and property tiles Path, People, and Type. The Active Query Box 145 appears as it does in FIG. 15B but with the arrow cursor moved over the Tags property pane 615. Because the active filter "biking" 600 is a tag, when the active filter "biking" 600 is clicked, the Tags property pane 615 is opened. At the top of the Tags property pane 615 is a text field 610 containing the invitational phrase "Filter by Tag." Beneath the text field 610 is a tag list indented according to type. The types of tags are: Events, Priority, and Projects. The tags beneath the Events type are: Honeymo . . . (Honeymoon) and Birthday. The tags beneath the Priority type are: High and Low. The tags beneath the Priority type are hidden.

Figure 16C:
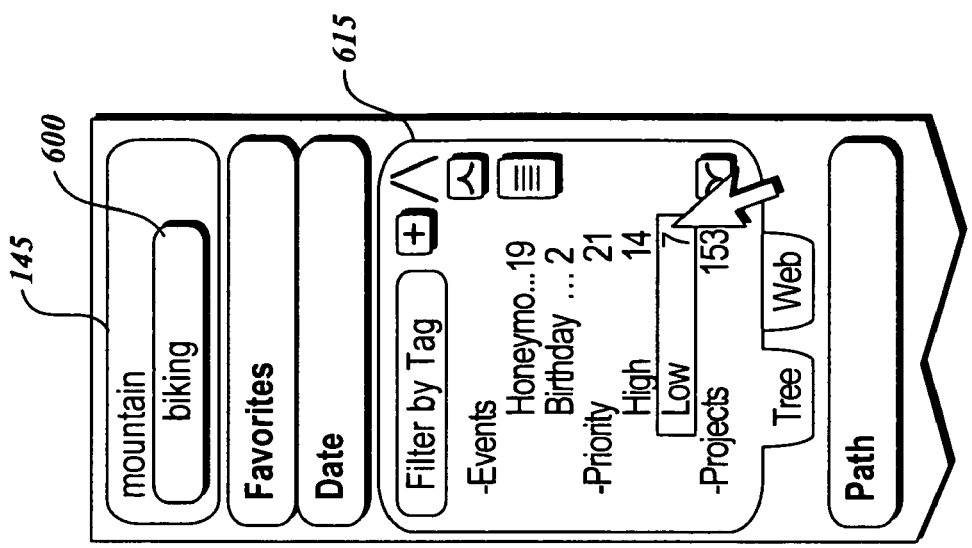
FIG. 16C is an exemplary search pane that contains an exemplary Active Query Box containing one text line and one highlighted active filter, an exemplary open Tags property pane containing text with one text line that is boxed to which an arrow cursor points, and a property tile.
Figure 16B:
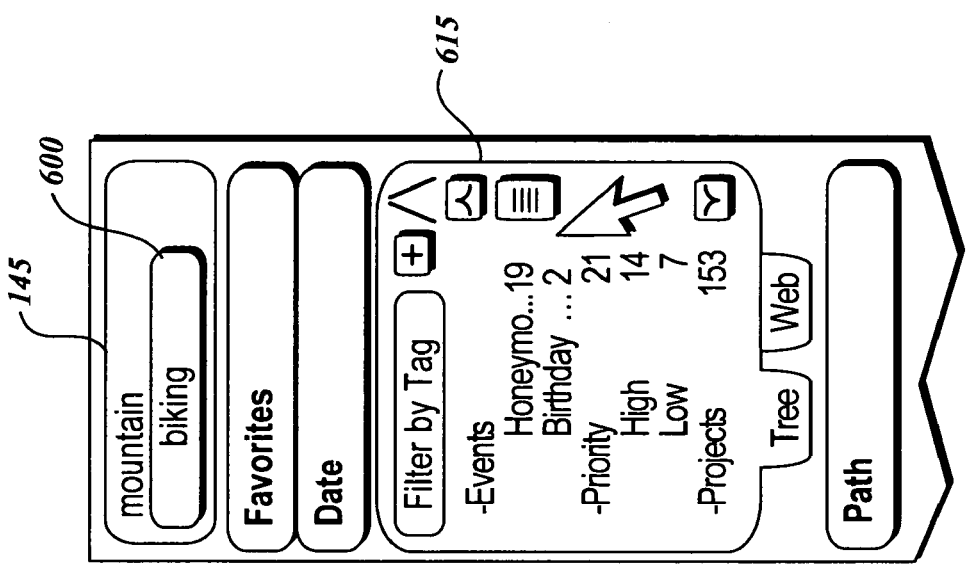
FIG. 16B is an exemplary search pane that contains an exemplary Active Query Box containing one text line and one highlighted active filter, an exemplary open Tags property pane, and a property tile.
Figure 16A:
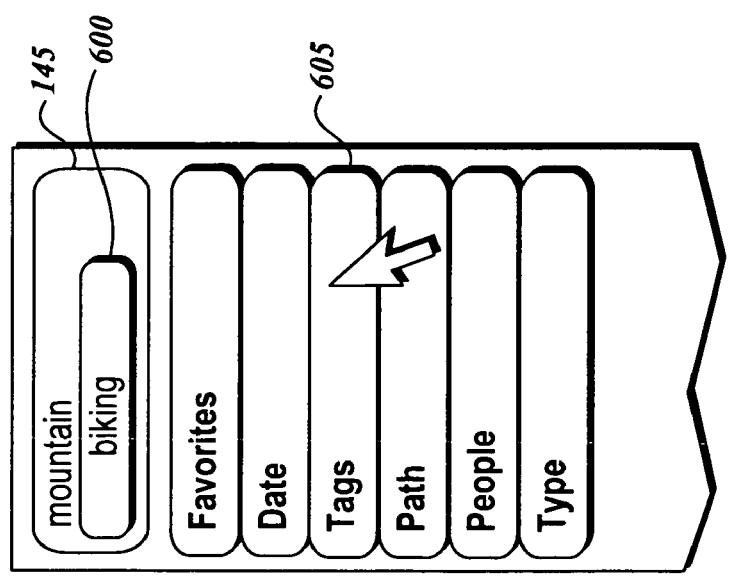
FIG. 16A is an exemplary search pane that contains an exemplary Active Query Box containing one text line and one highlighted active filter, property tiles, and an arrow cursor pointing to the property tile labeled "Tags;"
Figure 16E:
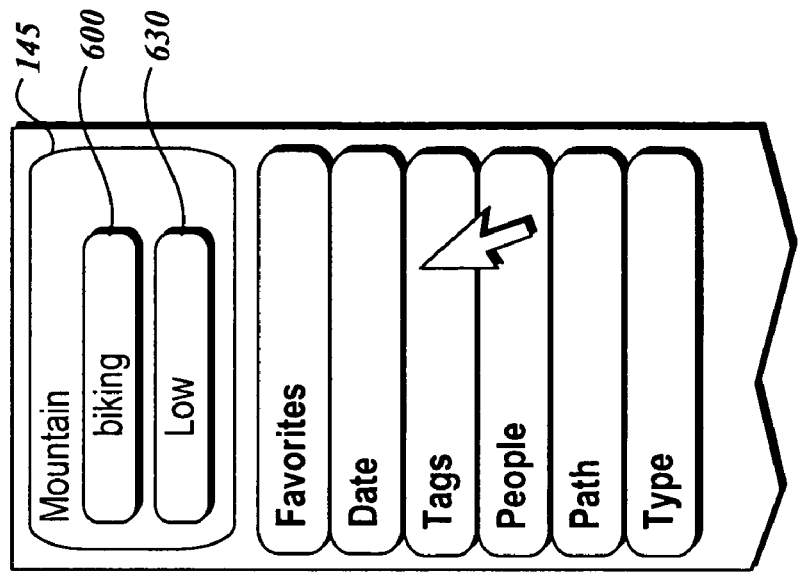
FIG. 16E is an exemplary search pane that contains an exemplary Active Query Box containing one text line and two highlighted active filters, four property tiles, and an arrow cursor that points to the top property tile.
Figure 16D:
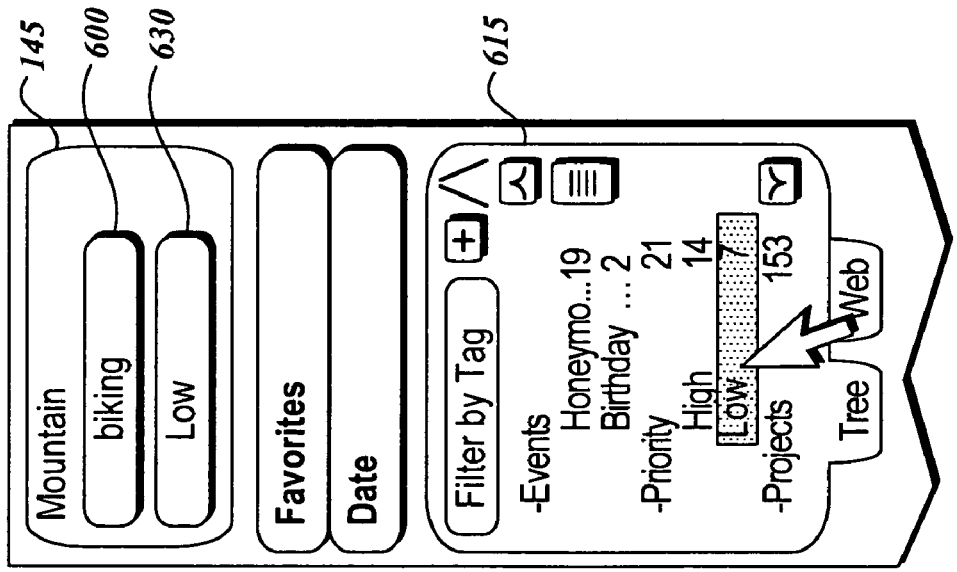
FIG. 16D is an exemplary search pane that contains an exemplary Active Query Box containing one text line and two highlighted active filters, two property tiles, and an exemplary open Tags property pane containing text with one text line that is highlighted and boxed to which an arrow cursor points.

As active filters are added to the Active Query Box 145, searches are executed and the results in the results pane 110 are modified. FIGS. 16A through 16E show how additional active filters are added to the Active Query Box 145. In FIG. 16A, the Active Query Box 145 contains the term "mountain" and the active filter "biking" 600. Below the Active Query Box 145 are property tiles Favorites, Date, Tags, Path, People, and Type. The arrow cursor is rolled over the Tags property tile 605. When the Tags property tile 605 is clicked, the Tags property pane opens as shown in FIG. 16B and appears as in FIG. 15C. In FIG. 16C, the arrow cursor is rolled over the "Low" tag causing the "Low" tag to be boxed, i.e., outlined by a rectangle. In FIG. 16D, the boxed "Low" tag is clicked causing the boxed "Low" tag to be highlighted and causing a "Low" active filter 630 to appear in the Active Query Box 145 along with the existing "biking" active filter 600. Additional active filters may be created by repeating the process described above. If the Close icon, i.e., the inverted "V" icon (^), is clicked, the Tags property pane is collapsed into the Tags property tile as shown in FIG. 16E.

Embodiments of the invention may enable custom, i.e., user created, active filters to be created. An exemplary process suitable for creating custom active filters is illustrated in FIGS. 17A through 17F. FIG. 17A shows the Date property pane 650 as it might appear after being expanded from the Date property tile in the exemplary set of property tiles shown in FIG. 1. In FIG. 17A, there is a text field at the top of the Date property pane 650 containing the invitational text "Filter by Date." To the right of the text field is a Close icon. Below the text field are the date property values and file totals: "Today," 21; "Yesterday," 21; "Last 7 days," 14; "Last 30 days," 0; "Older than 30 . . . (days)", 7; and "Custom . . . ," which is boxed and overlapped by an arrow cursor. When the boxed "Custom . . . " property value is clicked, a Create New Filter pane 655, illustrated in FIG. 17B, appears near the Date property pane 650.

The Create New Filter pane 655 illustrated in FIG. 17B enables the selection of date ranges. The Create New Filter pane 655 has a title bar across the top containing the phrase "Create New Filter." Below the title bar is a range type combo box, i.e., a combination of a text field and pull-down menu button, that enables text to be entered directly or selections to be chosen from a pull-down menu. The range type combo box enables the type of date range, e.g., before a certain date, to be chosen. The text field of the range type combo box contains the word "Between." Below the range type combo box are the Start and End Date combo boxes. Below the Start and End Date combo boxes are "OK" and "Cancel" buttons.

FIG. 17C illustrates an example of how a date range is created. In FIG. 17C, the pull-down menu 660 is activated by clicking on the down-arrow icon. A selection is made from the pull-down menu 660, e.g., "After" which then appears in the text field of the range type combo box shown in FIG. 17D. Since the range selected, i.e., "After" only requires one date, the Start Date combo box is shown and the End Date combo box is hidden. A start date of "Nov. 9, 2004" is chosen and may be applied by clicking the "OK" button or may be ignored by clicking the "Cancel" button. FIG. 17E illustrates a more complex example of how a date range is created. In FIG. 17E, "Between" is selected and appears in the range type combo box text field causing both the Start and End Date combo boxes to be shown. Clicking on the down arrow icon of the Start or End Date combo box causes a calender style date chooser to appear, shown in FIG. 17E. The left and right pointing arrows at the top of the date chooser enables scrolling through months. Clicking on a day in the month selects the date. After a date range is chosen, clicking the "OK" button causes the Create New Tag pane to close and the chosen date range to appear in the Date property pane text field, shown in FIG. 17F.

Figure 18:
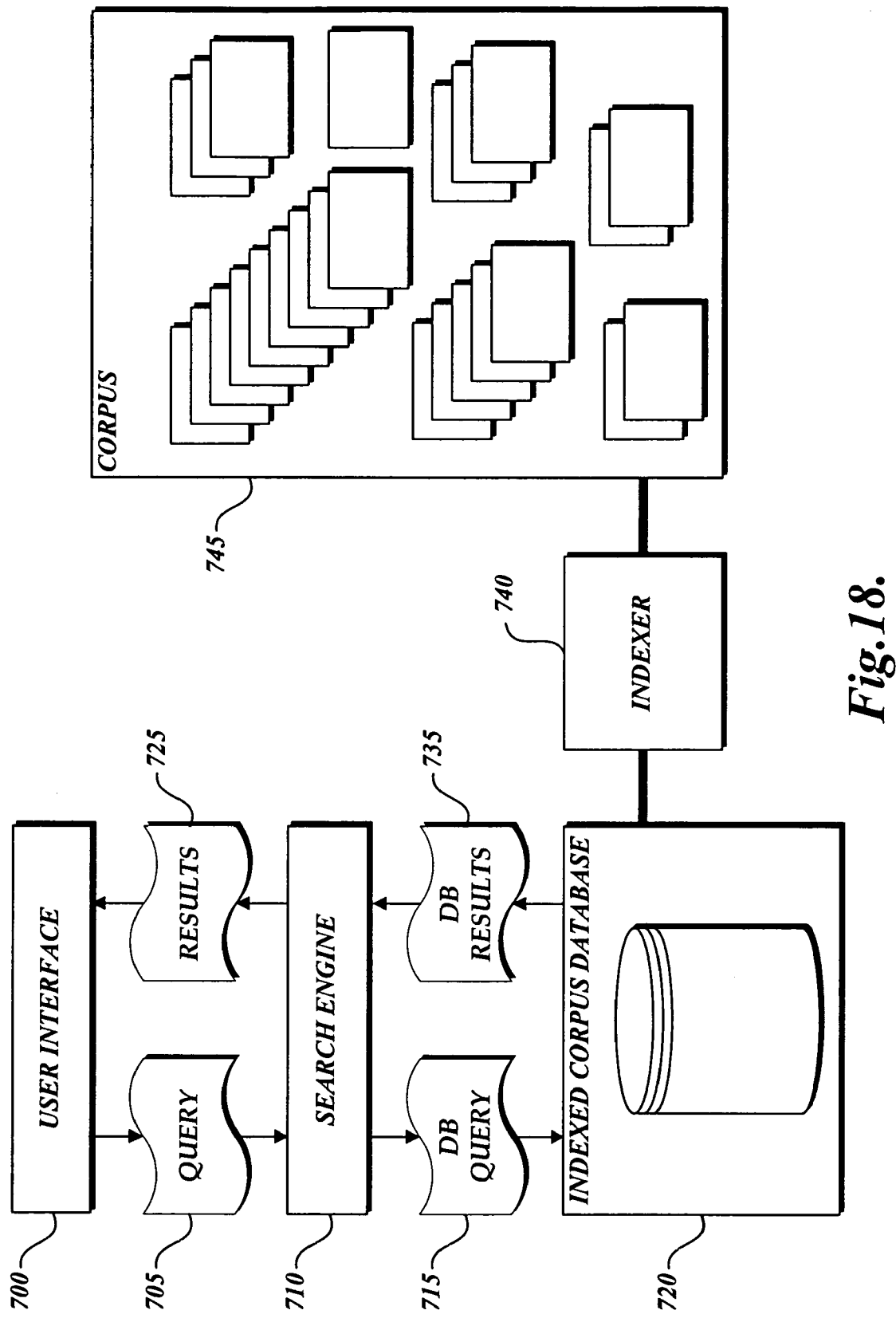
FIG. 18 is a block diagram of an exemplary computing system in which an exemplary search engine user interface may operate.

Search engine user interface elements, illustrated in FIGS. 1 through 17F and described above, are used to compose queries. Queries are used get results that are then displayed in various parts of the search engine user interface, for example, the results pane 110. FIG. 18 is an exemplary block diagram that shows how queries are used by an exemplary search engine user interface 700 to get results. A query 705 is composed using search engine user interface elements. For example, "biking" may be entered in the Active Query Box 145 causing a query 705 to be composed requesting files with titles that include the term "biking." The search engine user interface 700 submits the query 705 to a search engine 710. The search engine 710 transforms the query 705 into a database ("DB") query 715 and submits the database query 715 to an indexed corpus database 720. The indexed corpus database 720 determines which files in the corpus 745 meet the criteria of the submitted database query 715, i.e., files with titles that include the term "biking." The results, i.e., a list of files, are formed into database ("DB") results 735. The database results 735 are returned to the search engine 710. The search engine 710 transforms the database results 735 into results 725 for the search engine user interface 700, i.e., a human-readable list of files. The results 725 are displayed in the search engine user interface 700, e.g., the results pane 110. Periodically an indexer 740 scans a corpus 745 to update the indexed corpus database 720 making it easier and faster to perform searches of the corpus 745.

Figure 19:
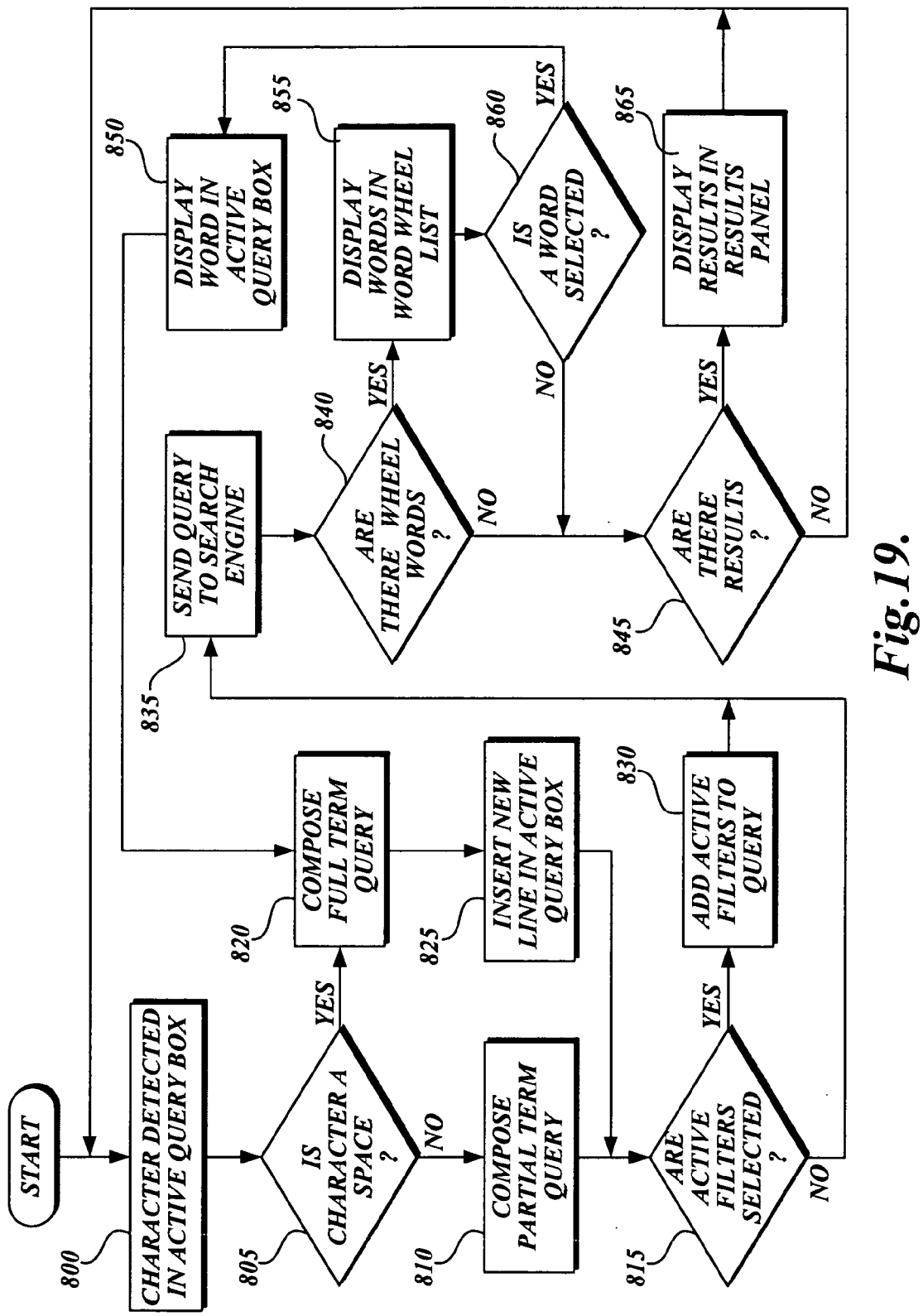
FIG. 19 is an exemplary functional flow diagram showing the operation of an exemplary search engine user interface.

FIG. 19 is an exemplary functional flow diagram that shows how the search engine user interface elements, illustrated in FIGS. 1 through 17F and described above, function during an exemplary search, namely, a search for files with titles that include the term "biking." The corpus searched may comprise files having a plurality of file content types. At block 800 a character, e.g., "b", is detected in the Active Query Box 145. At block 805, a test is made to determine if the entered character, "b", is a space, i.e., a term delimiter. Since the character is not a space, the control flows to block 810 where a partial term query is composed. Contrariwise, if, at block 805, the word "biking" had already been entered and a space, i.e., a term delimiter, had been entered after "biking," the control flows to block 820 where a full term query is composed. Flow passes from block 820 to block 825 where a newline character, i.e., a line delimiter, is entered into the Active Query Box 145 after the term, i.e., "biking." From either block 810 or block 825, the control flows to block 815 where a test is made to determine if any active filters have been selected. If active filters have been selected, e.g., tags for Events-Birthday and dates for the month of June, the selected active filters are added to the query at block 830. After active filters have been added, or if none have been selected, the query 705 is sent to a search engine 710 at block 835. The search engine 710 returns results to the search engine user interface 700. At block 840, the search engine user interface 700 determines if there are wheel words to display. If the results 725 contain wheel words, the wheel words, e.g., "Bike Parts Inc." and "Bikers at MS," are displayed in a wheel word list at block 855. If wheel words are displayed (block 855), at block 860 a test is made to determine if any words in the word-wheel list have been selected. If no wheel words list is displayed (block 840) or if no words are selected (block 860), at block 845 a test is made to determine if there are any results to display. If there are results to display, the results are displayed in the results pane 110 (block 865). If there are no results to display (block 845) or after the results are displayed (block 865), the process returns to block 800. Results may also be shown in other parts of the search engine user interface 700. If, at block 860, a wheel word is selected from the list of wheel words, at block 850, the word is displayed in the Active Query Box 145. The process then returns to the compose full term query block 820.

While the presently preferred embodiment has been illustrated and described, it will be appreciated that various changes can be made therein.

The embodiments of the invention in which an exclusive property or privilege is claimed are defined as follows:

1. A method of responding to a user input, the method comprising:
   displaying a user interface to be displayed on a computer display of a computing device outside of a Web browser, said user interface including a query pane for receiving user input and a results pane for displaying the results of a query;
   responding to the user input by displaying said user input in an active query box included in said query pane and automatically generating a search engine query including at least an automatically determined metadata property, tag, or subject matter, based at least in part on said user input, of a data corpus comprised of a plurality of file types without requiring additional user action, wherein said automatically determined metadata is not identical to said user input;
   displaying a word-wheel pop up when the results of said search engine query comprise a word-wheel, in response to a user selecting a word from said word-wheel pop up, changing said search engine query based on said selected word; and
      wherein the word-wheel suggests words or phrases that correspond to metadata related to the search terms, and wherein the metadata contains proper values which include at least one of the derived properties, subject matter, tags, and results from the active filters;

displaying the results of said search engine query, if any, in said results pane.

2. The method of responding to a user input as claimed in claim 1 further comprising:
responding to additional user input by automatically generating a further search engine query based on said additional user input without requiring additional user action; and
displaying the results of said further search engine query, if any, in said results pane.

3. The method of responding to a user input as claimed in claim 1 further comprising:
determining if said user input includes the selection of an active filter; and if said user input includes the selection of an active filter, including the active filter in said search engine query.

4. The method of responding to a user input as claimed in claim 1 further comprising:
determining if said user input includes the selection of an active filter; if said user input includes the selection of an active filter, including the active filter in said search engine query; and displaying information identifying said active filter in said Active Query Box.

5. The method of responding to a user input as claimed in claim 4 further comprising:
wherein said user interface also includes a property pane, said property pane including a plurality of property tiles; and
in response to user input selecting one of said property tiles causing a related property pane to be displayed, said property pane including information that identifies one or more active filters.

6. The method of responding to a user input as claimed in claim 5 further comprising:
in response to user input selecting one of said one or more active files including said active filter in said search engine query; and displaying information identifying said active filter in said Active Query Box.

7. The method of responding to a user input as claimed in claim 6 further comprising:
wherein said active filters including at least one of custom tags or file paths.

8. The method of responding to a user input as claimed in claim 1 further comprising:
associating data on a network associated with said computing device.

9. A method of dynamically interfacing with a search engine comprising:
displaying a user interface including a query pane for receiving user input and a results pane for displaying the results of a query for local data on a computing device;
displaying a property tiles pane in said user interface, said property tiles pane including a plurality of property tiles, each of said property tiles including a property pane, each of said property panes including one or more active filters, at least one of said one or more active filters is a user-created or user-edited active filter;
receiving user input via an active query box displayed in the query pane, wherein said user input is separated into individual search terms and combined into search phrases, wherein a new search term or a new search phrase is separated from a previous search term or a previous search phrase by placing it in a new line;
in response to said active query pane receiving user input, automatically generating a search engine query a data corpus comprising of a plurality of file types and having metadata related to at least one of a property of a datum of the corpus, a subject matter of a datum of the corpus, or a custom user tag of a datum of the corpus, based at least in part on at least one automatically derived property, subject matter, or tag of a datum of the corpus determined at least in part from the said user input without requiring additional user action, said automatically derived property, subject matter, or tag of a datum of the corpus not being identical to said user input;
displaying a word-wheel pop up when the results of said query cause said search engine to return a word-wheel;
wherein the word-wheel suggests words or phrases that correspond to metadata related to the search terms, and wherein the metadata contains proper values which include at least one of the derived properties, subject matter, tags, and results from the active filters; and
displaying the results of said search engine query, if any, in said results pane.

10. The method of claim 9 wherein the displaying of a user interface comprises displaying a user interface outside of a Web browser.

11. The method of dynamically interfacing with a search engine as claimed in claim 9 further comprising:
in response to additional user input automatically generating a further search engine query based on said additional user input without requiring additional user action; and
displaying the results of said further search engine query, if any, in said results pane.

12. The method of dynamically interfacing with a search engine as claimed in claim 9 further comprising:
determining if said user input includes the selection of said one or more active filters and
if said user input includes the selection of an active filter, including said active filter in said search engine query.

13. The method of dynamically interfacing with a search engine as claimed in claim 9 further comprising:
in response to a user selecting a word from said word-wheel pop up changing said user query based on said selected word.

14. The method of dynamically interfacing with a search engine as claimed in claim 13 further comprising:
in response to said user selecting a word from said word-wheel pop up automatically generating a further search engine query based on said user selected word; and
displaying the results of said additional user query, if any, in said result pane.

15. The method of dynamically interfacing with a search engine as claimed in claim 9 wherein in response to a user selecting an active filter from a property pane, adding said active filter to said search engine query.

16. A method for searching data, the method comprising:
using a corpus of searchable data comprising at least a plurality of data types and an indexed database of the corpus;
executing a search engine query on a search engine by using the indexed database of the corpus and returning one or more results of the search engine query;
receiving user entered text on a query pane and in response to receiving user entered text automatically generating at least one search engine query based at least in part on at least a predicted subject, property, or tag related to the user entered text but not containing the user entered text or roots of the user entered text itself in the generated query, without requiring additional user action, the user entered text is separated into individual search terms by a new line that separates an individual search term from another search term;

displaying a property tiles pane comprising a plurality of property tiles, each of the property tiles, when activated, displaying a property pane, each property pane comprising one or more active filters;

displaying results of executed queries on a results pane;

displaying an additional user interface that integrates custom tagging of files in a common file dialog box, the additional user interface, in response to receiving a custom tag for one or more files in the corpus, inserts the custom tag in the indexed database such that the custom tag is associated with the one or more files, the custom tag is a metadata that identifies a file as belonging to a group of files that exist in one or more directories in the corpus;

displaying a word-wheel pop up when the results of said query cause said search engine to return a word-wheel; and wherein the word-wheel suggests words or phrases that correspond to metadata related to the search terms, and wherein the metadata contains proper values which include at least one of the derived properties, subject matter, tags, and results from the active filters;

displaying the results of said search engine query, if any, in said results pane.

17. The method for searching data as claimed in claim 16 further comprising:

searching searchable data on a local network.

* * * * *

UNITED STATES PATENT AND TRADEMARK OFFICE
CERTIFICATE OF CORRECTION

| | | |
|---|---|---|
| PATENT NO. | : 7,703,040 B2 | Page 1 of 1 |
| APPLICATION NO. | : 11/172365 | |
| DATED | : April 20, 2010 | |
| INVENTOR(S) | : Edward B. Cutrell et al. | |

It is certified that error appears in the above-identified patent and that said Letters Patent is hereby corrected as shown below:

In column 15, line 65, in Claim 9, after "query" insert -- for --.

In column 16, line 5, in Claim 9, after "from" delete "the".

In column 16, line 32, in Claim 12, delete "filters" and insert -- filters; --, therefor.

Signed and Sealed this
Eighth Day of February, 2011

David J. Kappos
*Director of the United States Patent and Trademark Office*